(12) United States Patent
Negalaguli et al.

(10) Patent No.: US 10,178,513 B2
(45) Date of Patent: Jan. 8, 2019

(54) RELAY-MODE AND DIRECT-MODE OPERATIONS FOR PUSH-TO-TALK-OVER-CELLULAR (POC) USING WIFI-TECHNOLOGIES

(71) Applicant: Kodiak Networks Inc., Plano, TX (US)

(72) Inventors: Harisha M. Negalaguli, Richardson, TX (US); Krishnakant M. Patel, Richardson, TX (US); Brahmananda R. Vempati, Dallas, TX (US)

(73) Assignee: KODIAK NETWORKS, INC., Plano, TX (US)

( * ) Notice: Subject to any disclaimer, the term of this patent is extended or adjusted under 35 U.S.C. 154(b) by 0 days.

(21) Appl. No.: 15/435,037

(22) Filed: Feb. 16, 2017

(65) Prior Publication Data

US 2017/0164165 A1 Jun. 8, 2017

Related U.S. Application Data

(63) Continuation of application No. PCT/US2015/045951, filed on Aug. 19, 2015.

(Continued)

(51) Int. Cl.
*H04W 4/10* (2009.01)
*H04L 5/16* (2006.01)
(Continued)

(52) U.S. Cl.
CPC .............. *H04W 4/10* (2013.01); *H04L 5/16* (2013.01); *H04L 65/4061* (2013.01);
(Continued)

(58) Field of Classification Search
CPC ....... H04W 4/10; H04W 88/04; H04W 84/12; H04W 84/042; H04L 5/16
See application file for complete search history.

(56) References Cited

U.S. PATENT DOCUMENTS 3,912,874 A 10/1975 Botterell et al.
4,796,293 A 1/1989 Blinken et al.
(Continued)

FOREIGN PATENT DOCUMENTS

GB 2338150 A 3/1998
JP 200392776 A 10/2004
(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.
(Continued)

*Primary Examiner* — Thai Nguyen

(57) ABSTRACT

A system and method for relay-mode and direct-mode operations for Push-to-talk-over-Cellular (PoC) using WiFi technologies. One or more servers interface to a wireless communications network to perform advanced voice services for mobile units therein, wherein the advanced voice services include an instant two-way half-duplex voice call within a group of the mobile units comprising a PoC call session. Both the servers and the mobile units that use the advanced group services communicate with each other using control messages within the wireless communications network. At least one of the servers switches voice messages for the advanced group services between the mobile units across the wireless communications network. At least one of the servers manages the call session by acting as an arbitrator for the call session and by controlling the sending of the control messages and the voice messages to and from the mobile units. At least one of the mobile units performs Relay-Mode or Direct-Mode operations using WiFi communications for delivery of the control messages and the voice messages to (Continued)

and from others of the mobile units, thereby enabling the advanced voice services when access to the wireless communications network by the others of the mobile units is limited.

19 Claims, 5 Drawing Sheets

Related U.S. Application Data

(60) Provisional application No. 62/039,272, filed on Aug. 19, 2014.

(51) Int. Cl.
*H04L 29/06* (2006.01)
*H04W 88/04* (2009.01)
*H04W 12/02* (2009.01)
*H04W 84/08* (2009.01)
*H04W 88/06* (2009.01)

(52) U.S. Cl.
CPC .......... *H04L 63/166* (2013.01); *H04L 63/168* (2013.01); *H04W 12/02* (2013.01); *H04W 84/08* (2013.01); *H04W 88/04* (2013.01); *H04W 88/06* (2013.01)

(56) References Cited

U.S. PATENT DOCUMENTS

| | | |
|---|---|---|
| 5,353,328 A | 10/1994 | Jokimies |
| 5,442,809 A | 8/1995 | Diaz et al. |
| 5,546,449 A | 8/1996 | Hogan et al. |
| 5,711,011 A | 1/1998 | Urs et al. |
| 5,752,196 A | 5/1998 | Ahvenainen et al. |
| 5,987,318 A | 11/1999 | Alperovich et al. |
| 5,987,331 A | 11/1999 | Grube et al. |
| 6,011,976 A | 1/2000 | Michaels et al. |
| 6,021,326 A | 2/2000 | Nguyen |
| 6,138,011 A | 10/2000 | Sanders, iii et al. |
| 6,141,556 A | 10/2000 | Dougherty et al. |
| 6,192,119 B1 | 2/2001 | Wilson |
| 6,304,558 B1 | 10/2001 | Mysore |
| 6,397,054 B1 | 5/2002 | Hoirup et al. |
| 6,405,030 B1 | 6/2002 | Suprunov |
| 6,411,815 B1 | 6/2002 | Balasuriya |
| 6,473,501 B1 | 10/2002 | Paulsrud |
| 6,477,366 B1 | 11/2002 | Valentine et al. |
| 6,477,387 B1 | 11/2002 | Jackson et al. |
| 6,549,773 B1 | 4/2003 | Linden et al. |
| 6,577,874 B1 | 6/2003 | Dailey |
| 6,606,305 B1 | 8/2003 | Boyle et al. |
| 6,628,937 B1 | 9/2003 | Salin |
| 6,661,878 B1 | 12/2003 | Mirashrafi et al. |
| 6,725,053 B2 | 4/2004 | Rosen et al. |
| 6,751,468 B1 | 6/2004 | Heubel et al. |
| 6,801,762 B1 | 10/2004 | Huilgol |
| 6,856,676 B1 | 2/2005 | Pirot et al. |
| 6,865,398 B2 | 3/2005 | Mangal et al. |
| 6,892,074 B2 | 5/2005 | Tarkiainen et al. |
| 6,895,254 B2 | 5/2005 | Dorenbosch |
| 6,898,436 B2 | 5/2005 | Crockett et al. |
| 6,993,355 B1 | 1/2006 | Pershan |
| 6,996,414 B2 | 2/2006 | Vishwanathan et al. |
| 7,026,926 B1 | 4/2006 | Walker, III |
| 7,043,266 B2 | 6/2006 | Chaturvedi et al. |
| 7,082,316 B2 | 7/2006 | Elden et al. |
| 7,085,364 B1 | 8/2006 | Ahmed et al. |
| 7,099,291 B2 | 8/2006 | Harris et al. |
| 7,123,905 B1 | 10/2006 | Allaway et al. |
| 7,170,863 B1 | 1/2007 | Denman et al. |
| 7,231,225 B2 | 6/2007 | Rao et al. |
| 7,236,580 B1 | 6/2007 | Sarkar et al. |
| 7,330,540 B2 | 2/2008 | Darby et al. |
| 7,366,535 B2 | 4/2008 | Glass et al. |
| 7,403,775 B2 | 7/2008 | Patel et al. |
| 7,460,861 B2 | 12/2008 | Zabawskj |
| 7,529,557 B2 | 5/2009 | Farrill |
| 7,689,238 B2 | 3/2010 | Biswas et al. |
| 7,738,861 B2 | 6/2010 | Fournier |
| 7,738,892 B2 | 6/2010 | Ayyasamy et al. |
| 7,738,896 B2 | 6/2010 | Patel et al. |
| 7,751,348 B2 | 7/2010 | Shaffer et al. |
| 7,764,950 B2 | 7/2010 | Patel et al. |
| 7,787,896 B2 | 8/2010 | Kundu et al. |
| 7,797,010 B1 | 9/2010 | Manroa et al. |
| 7,813,722 B2 | 10/2010 | Patel et al. |
| 7,853,279 B2 | 12/2010 | Patel et al. |
| 8,036,692 B2 | 10/2011 | Ayyasamy et al. |
| 8,244,252 B2 | 8/2012 | Descombes |
| 8,369,829 B2 | 2/2013 | Nagubhai et al. |
| 8,478,261 B2 | 7/2013 | Vempati et al. |
| 8,498,660 B2 | 7/2013 | Lawler et al. |
| 8,670,760 B2 | 3/2014 | Lawler et al. |
| 8,676,189 B2 | 3/2014 | Lawler et al. |
| 9,282,130 B1 | 3/2016 | Goepp et al. |
| 2001/0005372 A1 | 6/2001 | Cave et al. |
| 2002/0009990 A1 | 1/2002 | Kleier et al. |
| 2002/0024943 A1 | 2/2002 | Karaul et al. |
| 2002/0077136 A1 | 6/2002 | Maggenti et al. |
| 2002/0086659 A1 | 7/2002 | Lauper |
| 2002/0086676 A1 | 7/2002 | Hendrey et al. |
| 2002/0102989 A1 | 8/2002 | Calvert et al. |
| 2002/0187750 A1 | 12/2002 | Majumdar |
| 2002/0196781 A1 | 12/2002 | Salovuori |
| 2003/0009463 A1 | 1/2003 | Gallant |
| 2003/0016632 A1 | 1/2003 | Refai et al. |
| 2003/0017836 A1 | 1/2003 | Vishwanathan et al. |
| 2003/0078064 A1 | 4/2003 | Chan |
| 2003/0119540 A1 | 6/2003 | Mathis |
| 2003/0148779 A1 | 8/2003 | Aravamudan et al. |
| 2003/0149774 A1 | 8/2003 | McConnell et al. |
| 2003/0153343 A1 | 8/2003 | Crockett et al. |
| 2003/0190888 A1 | 10/2003 | Mangal et al. |
| 2004/0032843 A1 | 2/2004 | Schaefer et al. |
| 2004/0057449 A1 | 3/2004 | Black |
| 2004/0067751 A1 | 4/2004 | Vandermeijden et al. |
| 2004/0095954 A1 | 5/2004 | Varney et al. |
| 2004/0121760 A1 | 6/2004 | Westman et al. |
| 2004/0127233 A1 | 7/2004 | Harris et al. |
| 2004/0152441 A1 | 8/2004 | Wong |
| 2004/0176100 A1 | 9/2004 | Florkey et al. |
| 2004/0179531 A1 | 9/2004 | Bi et al. |
| 2004/0196826 A1 | 10/2004 | Bao et al. |
| 2004/0203793 A1 | 10/2004 | Dorenbosch |
| 2004/0219941 A1 | 11/2004 | Haaramo et al. |
| 2004/0224710 A1 | 11/2004 | Koskelainen et al. |
| 2004/0228292 A1 | 11/2004 | Edwards |
| 2004/0259580 A1 | 12/2004 | Florkey et al. |
| 2005/0047362 A1 | 3/2005 | Harris et al. |
| 2005/0101308 A1 | 5/2005 | Lee |
| 2005/0111430 A1 | 5/2005 | Spear et al. |
| 2005/0119012 A1 | 6/2005 | Merheb et al. |
| 2005/0143135 A1 | 6/2005 | Brems et al. |
| 2005/0164737 A1 | 7/2005 | Brown |
| 2005/0189337 A1 | 9/2005 | Baune |
| 2005/0192041 A1 | 9/2005 | Oxley et al. |
| 2005/0202807 A1 | 9/2005 | Ayyasamy et al. |
| 2005/0221819 A1 | 10/2005 | Patel et al. |
| 2005/0232241 A1 | 10/2005 | Wu et al. |
| 2005/0239485 A1 | 10/2005 | Kundu et al. |
| 2005/0254464 A1 | 11/2005 | Patel et al. |
| 2005/0261016 A1 | 11/2005 | Patel et al. |
| 2006/0003740 A1 | 1/2006 | Munje |
| 2006/0003751 A1 | 1/2006 | Vo |
| 2006/0019654 A1 | 1/2006 | Farrill |
| 2006/0029189 A1 | 2/2006 | Patel et al. |
| 2006/0030347 A1 | 2/2006 | Biswas |
| 2006/0056361 A1 | 3/2006 | Jiang et al. |
| 2006/0067499 A1 | 3/2006 | Oliveira et al. |
| 2006/0078064 A1 | 4/2006 | Schmidt et al. |
| 2006/0094455 A1 | 5/2006 | Hannu et al. |
| 2006/0116150 A1 | 6/2006 | Bhutiani |

(56) References Cited

U.S. PATENT DOCUMENTS

| | | |
|---|---|---|
| 2006/0128411 A1 | 6/2006 | Turcanu |
| 2006/0178138 A1 | 8/2006 | Ostroff et al. |
| 2006/0189337 A1 | 8/2006 | Farrill et al. |
| 2006/0198334 A1 | 9/2006 | Civanlar et al. |
| 2006/0229090 A1 | 10/2006 | LaDue |
| 2006/0234687 A1 | 10/2006 | Patel et al. |
| 2007/0037562 A1 | 2/2007 | Smith-Kerker et al. |
| 2007/0037597 A1 | 2/2007 | Biswas et al. |
| 2007/0037598 A1 | 2/2007 | Ayyasamy et al. |
| 2007/0049314 A1 | 3/2007 | Balachandran et al. |
| 2007/0070976 A1 | 3/2007 | Mussman et al. |
| 2007/0094409 A1 | 4/2007 | Crockett et al. |
| 2007/0099609 A1 | 5/2007 | Cai |
| 2007/0133478 A1 | 6/2007 | Armbruster et al. |
| 2007/0133757 A1 | 6/2007 | Girouard et al. |
| 2007/0154005 A1 | 7/2007 | Daigle |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2008/0064364 A1 | 3/2008 | Patel et al. |
| 2008/0126230 A1 | 5/2008 | Bellora et al. |
| 2008/0147671 A1 | 6/2008 | Simon et al. |
| 2008/0299953 A1 | 12/2008 | Rao |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0209235 A1 | 8/2009 | Lawler et al. |
| 2009/0279512 A1 | 11/2009 | Fujishima |
| 2009/0325540 A1 | 12/2009 | Yach et al. |
| 2010/0035593 A1 | 2/2010 | Fanco et al. |
| 2010/0142414 A1 | 6/2010 | Patel et al. |
| 2010/0190492 A1 | 7/2010 | Jiang |
| 2010/0234018 A1 | 9/2010 | Lawler et al. |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2013/0021965 A1 | 1/2013 | Chu et al. |
| 2013/0155875 A1* | 6/2013 | Ayyasamy .......... H04W 76/005 370/242 |
| 2013/0196706 A1 | 8/2013 | Patel et al. |
| 2013/0231088 A1 | 9/2013 | Jabara et al. |
| 2013/0272436 A1 | 10/2013 | Makhlouf et al. |
| 2013/0337859 A1 | 12/2013 | Patel et al. |
| 2014/0078898 A1 | 3/2014 | Anchan et al. |
| 2014/0094119 A1 | 4/2014 | Stojanovski et al. |
| 2014/0148210 A1 | 5/2014 | Kundu et al. |
| 2014/0177515 A1* | 6/2014 | Matsushima ......... H04L 65/605 370/315 |
| 2015/0078295 A1 | 3/2015 | Mandyam et al. |
| 2015/0092704 A1 | 4/2015 | Chen |
| 2016/0269945 A1 | 9/2016 | Jang et al. |

FOREIGN PATENT DOCUMENTS

| | | |
|---|---|---|
| WO | 00069189 | 11/2000 |
| WO | 0079825 A1 | 12/2000 |
| WO | 0167674 A2 | 9/2001 |
| WO | 02101981 A1 | 12/2002 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A2 | 10/2006 |
| WO | 2010048217 A1 | 4/2010 |
| WO | 2010117815 A1 | 10/2010 |

OTHER PUBLICATIONS

Nokia: "What is TETRA? Why Nokia TETRA?", The Nokia TETRA Primer, 2002, pp. 1-29.

Skype: "Skype", Web Archive—Skype, May 22, 2004, pp. 1-2, May 22, 2004, pp. 1-2.

Trachwell: "TrackWell Software and TETRA Iceland deliver value added services to Tetra users", trackwell.com, Oct. 2002, pp. 1-1.

* cited by examiner

RELAY-MODE AND DIRECT-MODE OPERATIONS FOR PUSH-TO-TALK-OVER-CELLULAR (POC) USING WIFI-TECHNOLOGIES

CROSS-REFERENCE TO RELATED APPLICATIONS

This application is a continuation of International Application Serial No. PCT/2015/045951, filed Aug. 19, 2015, entitled "RELAY-MODE AND DIRECT-MODE OPERATIONS FOR PUSH-TO-TALK-OVER-CELLULAR (POC) USING WIFI-TECHNOLOGIES," which claims the benefit under 35 U.S.C. Section 119(e) of the following and commonly-assigned patent application: U.S. Provisional Application Ser. No. 62/039,272, filed Aug. 19, 2014, by Harisha Mahabaleshwara Negalaguli, Krishnakant M. Patel, and Brahmananda R. Vempati, entitled "PUSH-TO-TALK-OVER-CELLULAR (POC) USING WIFI-MULTICAST AND WIFI-DIRECT," which application is incorporated by reference herein.

This application is related to the following commonly-assigned patent applications: U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK," now U.S. Pat. No. 7,787,896, issued Aug. 31, 2010, which application claims the benefit under 35 U.S.C. Section 365 of P.C.T. International Application Serial Number PCT/US03/16386, which application claims the benefit under 35 U.S.C. Section 119(e) of U.S. Provisional Application Ser. Nos. 60/382,981, 60/383,179 and 60/407,168;

U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 365 of P.C.T. International Application Serial Number PCT/US04/23038, which application claims the benefit under 35 U.S.C. Section 119(e) of U.S. Provisional Application Ser. Nos. 60/488,638, 60/492,650 and 60/576,094 and which application is a continuation-in-part and claims the benefit under 35 U.S.C. Sections 119, 120 and/or 365 of P.C.T. International Application Serial Number PCT/US03/16386;

U.S. Utility application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS," now U.S. Pat. No. 7,738,892, issued Jun. 15, 2010, which application claims the benefit under 35 U.S.C. Section 119(e) of U.S. Provisional Application Ser. Nos. 60/569,953 and 60/579,309, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," now U.S. Pat. No. 7,403,775, issued Jul. 22, 2008, which application claims the benefit under 35 U.S.C. Section 119(e) of U.S. Provisional Application Ser. No. 60/571,075, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK," now U.S. Pat. No. 7,764,950, issued Jul. 27, 2010, which application claims the benefit under 35 U.S.C. Section 119(e) of U.S. Provisional Application Ser. Nos. 60/573,059 and 60/576,092, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/129,268;

U.S. Utility application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS," now U.S. Pat. No. 7,738,896, issued Jun. 15, 2010, which application claims the benefit under 35 U.S.C. Section 119(e) of U.S. Provisional Application Ser. No. 60/573,780, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/134,883;

U.S. Utility application Ser. No. 11/158,527, filed Jun. 22, 2005, by F. Craig Farrill, entitled "PRESS-TO-CONNECT FOR WIRELESS COMMUNICATIONS SYSTEMS," now U.S. Pat. No. 7,529,557, issued May 5, 2009, which application claims the benefit under 35 U.S.C. Section 119(e) of U.S. Provisional Application Ser. No. 60/581,954, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS," which application claims the benefit under 35 U.S.C. Section 119(e) of U.S. Provisional Application Ser. No. 60/588,464;

U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS," now U.S. Pat. No. 7,813,722, issued Oct. 12, 2010, which application claims the benefit under 35 U.S.C. Section 119(e) of U.S. Provisional Application Ser. No. 60/654,271;

P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE," which application claims the benefit under 35 U.S.C. Section 119(e) of U.S. Provisional Application Ser. No. 60/666,424;

U.S. Utility application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS," now U.S. Pat. No. 7,689,238, issued Mar. 30, 2010, which application claims the benefit under 35 U.S.C. Section 119(e) of U.S. Provisional Application Ser. No. 60/705,115;

U.S. Utility application Ser. No. 11/463,186, filed Aug. 8, 2006, by Ravi Ayyasamy and Krishnakant M. Patel, entitled "ADVANCED VOICE SERVICES CLIENT FOR BREW PLATFORM," now U.S. Pat. No. 8,036,692, issued Oct. 11, 2011, which application claims the benefit under 35 U.S.C. Section 119(e) of U.S. Provisional Application Ser. No. 60/706,265;

U.S. Utility application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Application Ser. No. 60/742,250;

U.S. Utility application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM," now U.S. Pat. No. 7,853,279, issued Dec. 14, 2010, which application claims the benefit under 35 U.S.C. Section 119(e) of U.S. Provisional Application Ser. No. 60/795,090;

U.S. Utility application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS," which application claims the benefit under 35 U.S.C. Section 119(e) of U.S. Provisional Application Ser. No. 60/836,521

U.S. Utility application Ser. No. 12/259,102, filed on Oct. 27, 2008, by Krishnakant M. Patel, Gorachand Kundu, and Ravi Ayyasamy, entitled "CONNECTED PORTFOLIO SERVICES FOR A WIRELESS COMMUNICATIONS NETWORK," which application claims the benefit under 35 U.S.C. Section 119(e) of U.S. Provisional Application Ser. Nos. 60/982,650 and 61/023,042;

U.S. Utility application Ser. No. 12/359,861, filed on Jan. 26, 2009, by Bruce D. Lawler, Krishnakant M. Patel, Ravi Ayyasamy, Harisha Mahabaleshwara Negalaguli, Binu Kaiparambil, Shiva Cheedella, Brahmananda R. Vempati, Ravi Shankar Kumar, and Avrind Shanbhag, entitled "CONVERGED MOBILE-WEB COMMUNICATIONS SOLUTION," now U.S. Pat. No. 8,676,189, issued Mar. 18, 2014, which application claims the benefit under 35 U.S.C. Section 119(e) of U.S. Provisional Application Ser. No. 61/023,332;

U.S. Utility application Ser. No. 12/582,601, filed Oct. 20, 2009, by Krishnakant M. Patel, Ravi Ayyasamy, Gorachand Kundu, Basem A. Ardah, Anand Narayanan, Brahmananda R. Vempati, and Pratap Chandana, entitled "HYBRID PUSH-TO-TALK FOR MOBILE PHONE NETWORKS," which application claims the benefit under 35 U.S.C. Section 119(e) of U.S. Provisional Application Ser. No. 61/106,689;

U.S. Utility application Ser. No. 12/781,566, filed on May 17, 2010, by Bruce D. Lawler, Krishnakant M. Patel, Ravi Ayyasamy, Harisha Mahabaleshwara Negalaguli, Binu Kaiparambil, Shiva K. K. Cheedella, Brahmananda R. Vempati, and Ravi Shankar Kumar, entitled "CONVERGED MOBILE-WEB COMMUNICATIONS SOLUTION," now U.S. Pat. No. 8,670,760, issued Mar. 11, 2014, which application is a continuation-in-part and claims the benefit under 35 U.S.C. Sections 119, 120 and/or 365 of U.S. Utility application Ser. No. 12/582,601;

U.S. Utility application Ser. No. 12/750,175, filed on Mar. 30, 2010, by Bruce D. Lawler, Krishnakant M. Patel, Ravi Ayyasamy, Harisha Mahabaleshwara Negalaguli, Basem A. Ardah, Gorachund Kundu, Ramu Kandula, Brahmananda R. Vempati, Ravi Shankar Kumar, Chetal M. Patel, and Shiva K. K. Cheedella, entitled "ENHANCED GROUP CALLING FEATURES FOR CONNECTED PORTFOLIO SERVICES IN A WIRELESS COMMUNICATIONS NETWORK," now U.S. Pat. No. 8,498,660, issued Jul. 30, 2013, which application claims the benefit under 35 U.S.C. Section 119(e) of U.S. Provisional Application Ser. Nos. 61/164,754 and 61/172,129;

U.S. Utility application Ser. No. 12/961,419, filed Dec. 6, 2010, by Ravi Ayyasamy, Bruce D. Lawler, Brahmananda R. Vempati, Gorachand Kundu and Krishnakant M. Patel, entitled "COMMUNITY GROUP CLIENT AND COMMUNITY AUTO DISCOVERY SOLUTIONS IN A WIRELESS COMMUNICATIONS NETWORK," which application claims the benefit under 35 U.S.C. Section 119(e) of U.S. Provisional Application Ser. No. 61/266,896

U.S. Utility application Ser. No. 13/039,635, filed on Mar. 3, 2011, by Narasimha Raju Nagubhai, Ravi Shankar Kumar, Krishnakant M. Patel, and Ravi Ayyasamy, entitled "PREPAID BILLING SOLUTIONS FOR PUSH-TO-TALK IN A WIRELESS COMMUNICATIONS NETWORK," now U.S. Pat. No. 8,369,829, issued Feb. 5, 2013, which application claims the benefit under 35 U.S.C. Section 119(e) of U.S. Provisional Application Ser. No. 61/310,245;

U.S. Utility application Ser. No. 13/093,542, filed Apr. 25, 2011, by Brahmananda R. Vempati, Krishnakant M. Patel, Pratap Chandana, Anand Narayanan, Ravi Ayyasamy, Bruce D. Lawler, Basem A. Ardah, Ramu Kandula, Gorachand Kundu, Ravi Shankar Kumar, and Bibhudatta Biswal, and entitled "PREDICTIVE WAKEUP FOR PUSH-TO-TALK-OVER-CELLULAR (PoC) CALL SETUP OPTIMIZATIONS," now U.S. Pat. No. 8,478,261, issued Jul. 2, 2013, which application claims the benefit under 35 U.S.C. Section 119(e) of U.S. Provisional Application Ser. No. 61/347,217;

U.S. Utility application Ser. No. 13/710,683, filed Dec. 11, 2012, by Ravi Ayyasamy, Gorachand Kundu, Krishnakant M. Patel, Brahmananda R. Vempati, Harisha M. Negalaguli, Shiva K. K. Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC)," which application claims the benefit under 35 U.S.C. Section 119(e) of U.S. Provisional Application Ser. No. 61/570,694;

U.S. Utility application Ser. No. 13/917,561, filed Jun. 13, 2013, by Krishnakant M. Patel, Brahmananda R. Vempati, Anand Narayanan, Gregory J. Morton, and Ravi Ayyasamy, entitled "RUGGEDIZED CASE OR SLEEVE FOR PROVIDING PUSH-TO-TALK (PTT) FUNCTIONS," which application claims the benefit under 35 U.S.C. Section 119(e) of U.S. Provisional Application Ser. No. 61/659,292;

U.S. Provisional Application Ser. No. 61/682,524; and U.S. Provisional Application Ser. No. 61/705,748;

U.S. Utility application Ser. No. 13/757,520, filed Feb. 1, 2013, by Krishnakant M. Patel, Harisha Mahabaleshwara Negalaguli, Brahmananda R. Vempati, Shiva Koteshwara Kiran Cheedella, Arun Velayudhan, Raajeev Kuppa, Gorachand Kundu, Ravi Ganesh Ramamoorthy, Ramu Kandula, Ravi Ayyasamy, and Ravi Shankar Kumar, entitled "WiFi INTERWORKING SOLUTIONS FOR PUSH-TO-TALK-OVER-CELLULAR (PoC)," which application claims the benefit under 35 U.S.C. Section 119(e) of U.S. Provisional Application Ser. No. 61/593,485;

U.S. Utility application Ser. No. 14/093,240, filed Nov. 29, 2013, by Gorachand Kundu, Krishnakant M. Patel, Harisha Mahabaleshwara Negalaguli, Ramu Kandula, and Ravi Ayyasamy, entitled "METHOD AND FRAMEWORK TO DETECT SERVICE USERS IN INSUFFICIENT WIRELESS RADIO COVERAGE NETWORK AND IMPROVE SERVICE DELIVERY EXPERIENCE BY GUARANTEED PRESENCE," which application claims the benefit under 35 U.S.C. Section 119(e) of U.S. Provisional Application Ser. No. 61/730,856;

P.C.T. International Application Serial Number PCT/US2014/036414, filed May 1, 2014, by Krishnakant M. Patel, Harisha Mahabaleshwara Negalaguli, Arun Velayudhan, Ramu Kandula, Syed Nazir Khadar, Shiva Koteshwara Kiran Cheedella, and Subramanyam Narasimha Prashanth, entitled "VOICE-OVER-IP (VOIP) DENIAL OF SERVICE (DOS) PROTECTION MECHANISMS FROM ATTACK," which application claims the benefit under 35 U.S.C. Section 119(e) of U.S. Provisional Application Ser. No. 61/818,109; and U.S. Provisional Application Ser. No. 61/821,975;

U.S. Utility application Ser. No. 14/286,427, filed May 23, 2014, by Krishnakant M. Patel, Ravi Ayyasamy and Brahmananda R. Vempati, entitled "METHOD TO ACHIEVE A FULLY ACKNOWLEDGED MODE COMMUNICATION IN PUSH-TO-TALK OVER CELLULAR (PoC)," which application claims the benefit under 35 U.S.C. Section 119(e) of U.S. Provisional Application Ser. No. 61/826,895;

P.C.T. International Application Serial Number PCT/US2014/047863, filed on Jul. 23, 2014, by Gorachand Kundu, Giridhar K. Boray, Brahmananda R. Vempati, Krishnakant M. Patel, Ravi Ayyasamy, and Harisha M. Negalaguli, entitled "EFFECTIVE PRESENCE FOR PUSH-TO-TALK-OVER-CELLULAR (PoC) NETWORKS," which application claims the benefit under 35 U.S.C. Section 119(e) of U.S. Provisional Application Ser. No. 61/857,363; and U.S. Provisional Application Ser. No. 61/944,168;

P.C.T. International Application Serial Number PCT/US15/10617, filed Jan. 8, 2015, by Krishnakant M. Patel, Brahmananda R. Vempati, and Harisha Mahabaleshwara Negalaguli, entitled "OPTIMIZED METHODS FOR LARGE GROUP CALLING USING UNICAST AND MULTICAST TRANSPORT BEARER FOR PUSH-TO-TALK-OVER-CELLULAR (PoC)," which application claims the benefit under 35 U.S.C. Section 119(e) of U.S. Provisional Application Ser. No. 61/924,897;

P.C.T. International Application Serial Number PCT/US2014/047886, filed on Jul. 23, 2014, by Gorachand Kundu, Giridhar K. Boray, Brahmananda R. Vempati, Krishnakant M. Patel, Ravi Ayyasamy, Harisha Mahabaleshwara Negalaguli, and Ramu Kandula, entitled "RADIO ACCESS NETWORK (RAN) AWARE SERVICE DELIVERY FOR PUSH-TO-TALK-OVER-CELLULAR (PoC) NETWORKS," which application is a continuation-in-part under 35 U.S.C. Section 120 of P.C.T. International Application Serial Number PCT/US2014/047863; and U.S. Utility application Ser. No. 14/639,794, filed Mar. 5, 2015, by Krishnakant M. Patel, Brahmananda R. Vempati, Ravi Ayyasamy, and Bibhudatta Biswal, entitled "PUSH-TO-TALK-OVER-CELLULAR (POC) SERVICE IN HETEROGENEOUS NETWORKS (HETNETS) AND MULTI-MODE SMALL CELL ENVIRONMENTS," which application claims the benefit under 35 U.S.C. Section 119(e) of U.S. Provisional Application Ser. No. 61/948,429, all of which applications are incorporated by reference herein.

BACKGROUND OF THE INVENTION

1. Field of the Invention

This invention relates in general to advanced voice services in wireless communications networks, and more specifically, to relay-mode and direct-mode operations for Push-to-talk-over-Cellular (PoC) using WiFi technologies.

2. Description of Related Art

Advanced voice services (AVS), also known as Advanced Group Services (AGS), such as two-way half-duplex voice calls within a group, also known as Push-to-talk-over-Cellular (PoC), Push-to-Talk (PTT), or Press-to-Talk (P2T), and one-way half-duplex voice calls within a group, also known as Broadcast, as well as other AVS functions, such as Push-to-Conference (P2C) or Instant Conferencing, Push-to-Message (P2M), etc., are described in the co-pending and commonly-assigned patent applications cross-referenced above and incorporated by reference herein. These AVS functions have enormous revenue earnings potential for wireless communications systems, such as cellular networks, wireless data networks and IP networks.

One approach to PoC is based on packet or voice-over-IP (VoIP) technologies. This approach capitalizes on the "bursty" nature of PoC conversations and makes network resources available only during talk bursts and hence is highly efficient from the point of view of network and spectral resources. This approach promises compliance with newer and emerging packet-based standards, such as GPRS (General Packet Radio Service), UMTS (Universal Mobile Telecommunications System), 3G/4G/LTE ($3^{rd}$ Generation/$4^{th}$ Generation/Long Term Evolution), etc.

Nonetheless, there is a need in the art for improvements to the methods and systems for delivering the advanced voice services, such as PoC, that comply with both existing and emerging wireless packet-based standards and yet provide superior user experiences. Many existing implementations of PoC suffer from an inferior user experience. The present invention satisfies the need for a superior user experience, and also defines procedures for practical implementation of PoC in commercial, standards-based, cellular networks.

SUMMARY OF THE INVENTION

To overcome the limitations in the prior art described above, and to overcome other limitations that will become apparent upon reading and understanding the present specification, the present invention discloses a system and method for relay-mode and direct-mode operations for Push-to-talk-over-Cellular (PoC) using WiFi technologies. One or more servers interface to a wireless communications network to perform advanced voice services for mobile units therein, wherein the advanced voice services include an instant two-way half-duplex voice call within a group of the mobile units comprising a PoC call session. Both the servers and the mobile units that use the advanced group services communicate with each other using control messages within the wireless communications network. At least one of the servers switches voice messages for the advanced group services between the mobile units across the wireless communications network. At least one of the servers manages the call session by acting as an arbitrator for the call session and by controlling the sending of the control messages and the voice messages to and from the mobile units. At least one of the mobile units performs Relay-Mode or Direct-Mode operations using WiFi communications for delivery of the control messages and the voice messages to and from others of the mobile units, thereby enabling the advanced voice services when access to the wireless communications network by the others of the mobile units is limited.

In one embodiment, the mobile units communicate locally among themselves using the WiFi communications for the delivery of the control messages and the voice messages. The WiFi communications may include using a local WiFi network and/or using WiFi-Direct. At least one of the servers maintains a list of the mobile units communicating locally among themselves using the WiFi communications.

In one embodiment, the mobile units communicate locally among themselves using Relay-Mode or Direct Mode communications for the delivery of the control messages and the voice messages. At least one of the servers maintains a list of the mobile units communicating locally among themselves using the Relay-Mode or Direct Mode communications.

There may be more than one of the mobile units that performs Relay-Mode or Direct-Mode operations. In this embodiment, one of the mobile units that perform Relay-Mode or Direct-Mode operations is elected as a leader for communicating with the wireless communications network, and others of the mobile units that perform Relay-Mode or Direct-Mode operations communicate with the leader.

The mobile units that perform Relay-Mode or Direct-Mode operations may be assigned by at least one of the servers based on one or more criteria. Moreover, the server that assigns the mobile units that perform Relay-Mode or Direct-Mode operations informs others of the mobile units of that assignment.

The mobile units that perform Relay-Mode or Direct-Mode operations may provide a message duplication function. In addition, the mobile units that perform Relay-Mode or Direct-Mode operations may provide unicast tunneling of multicast messages from one or more of the servers.

BRIEF DESCRIPTION OF THE DRAWINGS

Referring now to the drawings in which like reference numbers represent corresponding parts throughout.

DETAILED DESCRIPTION OF THE INVENTION

Figure 1:
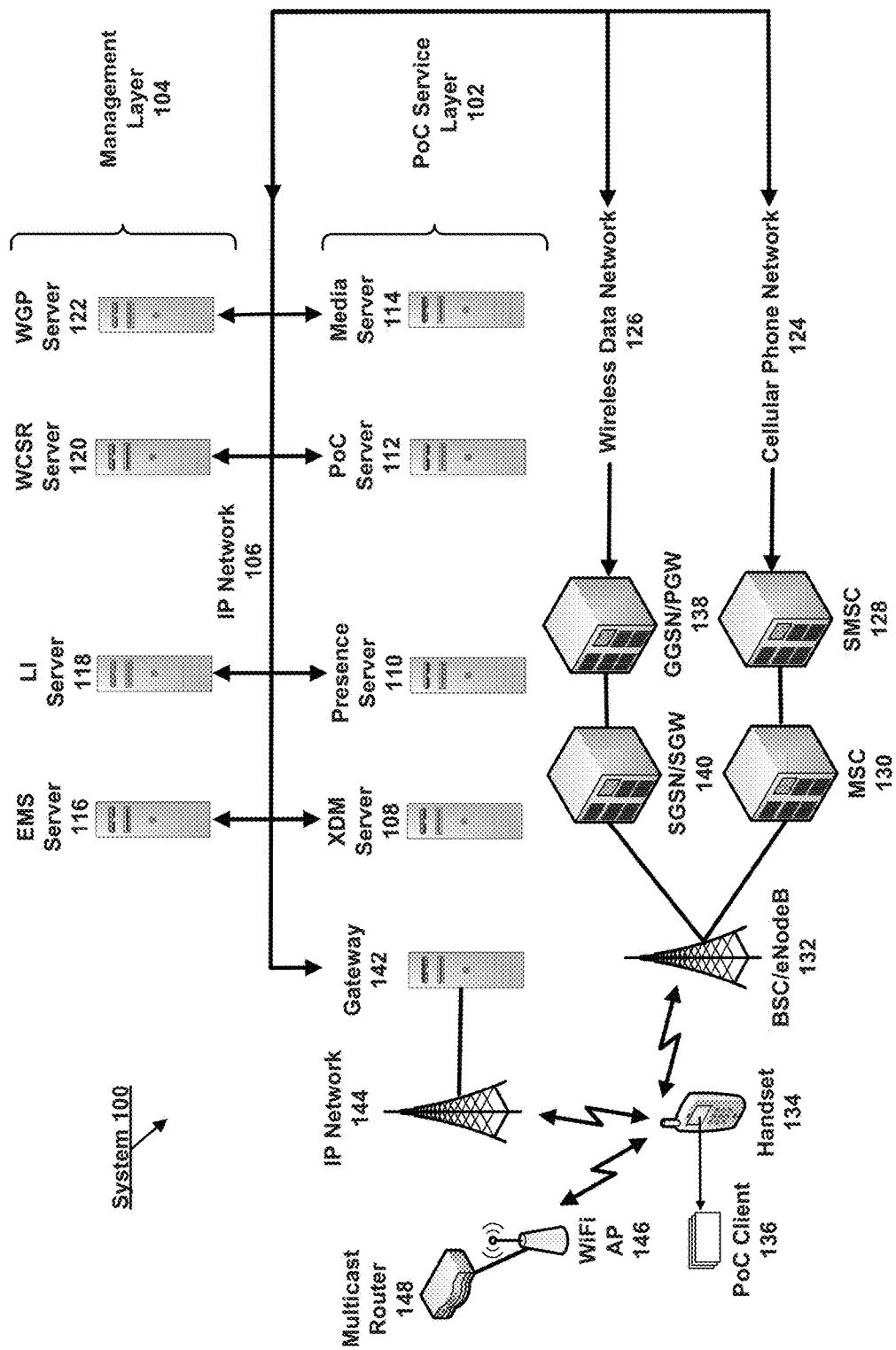
FIG. 1 illustrates the system architecture used in one embodiment of the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1 OVERVIEW

The present invention discloses a system for implementing advanced voice services in wireless communications networks that provides a feature-rich server architecture with a flexible client strategy. This system is an Open Mobile Alliance (OMA) standards-compliant solution that can be easily deployed, thereby enabling carriers to increase their profits, improve customer retention and attract new customers without costly upgrades to their network infrastructure. This system is built on a proven, reliable all-IP (Internet Protocol) platform. The highly scalable platform is designed to allow simple network planning and growth. Multiple servers can be distributed across operator networks for broad geographic coverage and scalability to serve a large and expanding subscriber base.

1.1 Definitions

The following table defines various acronyms, including industry-standard acronyms, that are used in this specification.

| Acronym | Description |
| --- | --- |
| ATCA | Advanced Telecommunications Computing Architecture |
| DnD | Do not Disturb |
| DNS | Domain Name Server |
| DTLS | Datagram Transport Layer Security |
| MBMS/eMBMS | Multimedia Broadcast Multicast Services |
| GPRS | General Packet Radio Service |
| GSM | Global System for Mobile communications |
| HTTP | Hypertext Transport Protocol |
| HTTPS | Secure Hypertext Transport Protocol |
| IMSI | International Mobile Subscriber Identity |
| IP | Internet Protocol |
| IPA | Instant Personal Alert |
| MBCP | Media Burst Control Protocol |
| MCC | Mobile Country Code |
| MDN | Mobile Directory Number |
| MNC | Mobile Network Code |
| MS-ISDN | Mobile Station International Subscriber Directory Number |
| OMA | Open Mobile Alliance |
| PoC | Push-to-talk-over-Cellular |
| PGW | Packet GateWay |
| PTT | Push-To-Talk |
| RTCP | Realtime Transport Control Protocol |
| RTP | Realtime Transport Protocol |
| SDP | Session Description Protocol |
| SGW | Serving GateWay |
| SIM | Subscriber Identity Module |

| Acronym | Description |
|---|---|
| SIP | Session Initiation Protocol |
| SMMP | Short Message peer-to-peer Protocol |
| SMS | Small Message Service |
| SRTP | Secure Real-time Transport Protocol |
| SSID | Service Set Identifier |
| SSL | Secure Sockets Layer protocol |
| SSRC | Synchronization SouRCe |
| TLS | Transport layer security protocol |
| UDP | User Datagram Protocol |
| URI | Uniform Resource Identifier |
| VoIP | Voice-over-IP |
| XCAP | XML Configuration Access Protocol |
| XDM | XML Document Management |
| XML | Extensible Mark-up Language |
| 4G/LTE | $4^{th}$ Generation/Long Term Evolution |

The following table defines various terms, including industry-standard terms, that are used in this specification.

| Term | Description |
|---|---|
| 1-1 PoC Session | A feature enabling a PoC User to establish a PoC Session with another PoC User. |
| Ad Hoc PoC Group Session | A PoC Group Session established by a PoC User to PoC Users listed on the invitation. The list includes PoC Users or PoC Groups or both. |
| Answer Mode | A PoC Client mode of operation for the terminating PoC Session invitation handling. |
| Controlling PoC Function | A function implemented in a PoC Server, providing centralized PoC Session handling, which includes media distribution, Talk Burst Control, Media Burst Control, policy enforcement for participation in the PoC Group Sessions, and participant information. |
| Corporate | These subscribers will only receive contacts and groups from a corporate administrator. That means they cannot create their own contacts and groups from handset. |
| Corporate Public | These subscribers receive contacts and groups from a corporate administrator in addition to user-created contacts and groups. |
| Corporate Administrator | A user who manages corporate subscribers, their contacts and groups. |
| Firewall | A device that acts as a barrier to prevent unauthorized or unwanted communications between computer networks and external devices. |
| Home PoC Server | The PoC Server of the PoC Service Provider that provides PoC service to the PoC User. |
| Instant Personal Alert | A feature in which a PoC User sends a SIP based instant message to a PoC User requesting a 1-1 PoC Session. |
| Law Enforcement Agency | An organization authorized by a lawful authorization based on a national law to request interception measures and to receive the results of telecommunications interceptions. |
| Lawful Interception | The legal authorization, process, and associated technical capabilities and activities of Law Enforcement Agencies related to the timely interception of signalling and content of wire, oral, or electronic communications. |
| Notification | A message sent from the Presence Service to a subscribed watcher when there is a change in the Presence Information of some presentity of interest, as recorded in one or more Subscriptions. |
| Participating PoC Function | A function implemented in a PoC Server, which provides PoC Session handling, which includes policy enforcement for incoming PoC Sessions and relays Talk Burst Control and Media Burst Control messages between the PoC Client and the PoC Server performing the Controlling PoC Function. The Participating PoC Function may also relay RTP Media between the PoC Client and the PoC Server performing the Controlling PoC Function. |
| PoC Client | A functional entity that resides on the User Equipment that supports the PoC service. |
| Pre-Arranged PoC Group Identity | A SIP URI identifying a Pre-Arranged PoC Group. A Pre-Arranged PoC Group Identity is used by the PoC Client, e.g., to establish PoC Group Sessions to the Pre-Arranged PoC Groups. |
| Pre-Arranged PoC Group | A persistent PoC Group. The establishment of a PoC Session to a Pre-Arranged PoC Group results in the members being invited. |
| Pre-Established Session | The Pre-Established Session is a SIP Session established between the PoC Client and its Home PoC Server. The PoC Client establishes the Pre-Established Session prior to making requests for PoC Sessions to other PoC Users. To establish a PoC Session based on a SIP request from the PoC User, the PoC Server conferences other PoC Servers or users to the Pre-Established Session so as to create an end-to-end connection. |
| Presence Server | A logical entity that receives Presence Information from a multitude of Presence Sources pertaining to the Presentities it serves and makes this information available to Watchers according to the rules associated with those Presentities. |
| Presentity | A logical entity that has Presence Information associated with it. This Presence Information may be composed from a multitude of Presence Sources. A Presentity is most commonly a reference for a person, although it may represent a role such as "help desk" or a resource such |

| Term | Description |
| --- | --- |
| | as "conference room #27". The Presentity is identified by a SIP URI, and may additionally be identified by a tel URI or a pres URI. |
| Public | These subscribers create and manage their contacts and groups. |
| Serving Server | A set of primary and secondary servers. |
| Subscription | The information kept by the Presence Service about a subscribed watcher's request to be notified of changes in the Presence Information of one or more Presentities. |
| Watcher | Any uniquely identifiable entity that requests Presence Information about a Presentity from the Presence Service. |
| WiFi | A wireless local area network (WLAN). |

2 SYSTEM ARCHITECTURE

FIG. 1 illustrates the system architecture used in the present invention. This architecture conforms to the Advanced Telecommunications Computing Architecture (ATCA) standard to support the advanced voice services of the present invention. ATCA is an open standards-based, high-availability telecommunications platform architecture.

Preferably, the system 100 includes one or more PoC Service Layers 102 and one or more Management Layers 104, each of which is comprised of one or more servers interconnected by one or more IP networks 106. Specifically, the PoC Service Layer 102 includes one or more XML Document Management (XDM) Servers 108, Presence Servers 110, PoC Servers 112, and Media Servers 114, while the Management Layer 104 includes one or more Element Management System (EMS) Servers 116, Lawful Intercept (LI) Servers 118, Web Customer Service Representative (WCSR) Servers 120, and Web Group Provisioning (WGP) Servers 122. These various servers are described in more detail below.

The PoC Service Layer 102 and Management Layer 104 are connected to one or more wireless communications networks, such as cellular phone networks 124 and wireless data networks 126, as well as one or more IP networks 106. Note that the cellular phone networks 124 and wireless data networks 126 may be implemented in a single network or as separate networks. The cellular phone network 124 includes one or more Short Message Service Centers (SMSCs) 128, Mobile Switching Centers (MSCs) 130, and Base Station Components (BSCs) 132, wherein the BSCs 132 include controllers and transceivers that communicate with one or more customer handsets 134 executing a PoC Client 136. A handset 134 is also referred to as a mobile unit, mobile station, mobile phone, cellular phone, etc. and may comprise any wireless and/or wired device. The wireless data network 126, depending on its type, e.g., GPRS or 4G/LTE, includes one or more Gateway GPRS Support Nodes (GGSNs) or Packet Gateways (PGWs) 138 and Serving GPRS Support Nodes (SGSNs) or Serving GateWays (SGWs) 140, which also communicate with customer handsets 134 via BSCs or eNodeBs 132.

In one embodiment of the present invention, the PoC Service Layer 102 and Management Layer 104 are connected to one or more Gateways 142, which are coupled to one or more external IP networks 144, in order to communicate with one or more PoC Clients 136 on one or more handsets 134. Traffic to and from the wireless data networks 126 also traverses Gateways 142.

In one embodiment of the present invention, the handsets 134 may be WiFi-enabled and thus capable of communicating with local WiFi networks, which may be comprised of one or more WiFi Access Points (APs) 146, as well as Multicast Routers 148. Moreover, the handsets 134 may be able to communicate directly with other handsets 134 using WiFi-Direct or other Direct Mode communications protocols.

2.1 Cellular Phone Network

The PoC Service Layer 102 interacts with the SMSC 128 on the cellular phone network 124 to handle Short Message Service (SMS) operations, such as routing, forwarding and storing incoming text messages on their way to desired endpoints.

2.2 Wireless Data Network

The PoC Service Layer 102 also interacts with the following entities on the wireless data network 126:

The GGSN/PGW 138 transfers IP packets between the PoC Client 136 and the various servers:
    SIP/IP signaling messages between the PoC Server 112 and PoC Client 136 for control traffic exchange (i.e., control packets) for PoC call sessions.
    RTP/IP, RTCP/IP and MBCP/IP packets between the Media Server 114 and PoC Client 136 for bearer traffic exchange (i.e., voice packets) for PoC call sessions.
    SIP/IP signaling messages between the Presence Server no and PoC Client 136 for presence information.
    XCAP/HTTP/IP and SIP/IP signaling between the XDM Server 108 and PoC Client 136 for document management.

The SMSC 128 handles authentication:
    The XDM Server 108 communicates with the SMSC 128 via SMPP/IP for receiving the authentication code required for PoC Client 136 activation from the handset 134.

2.3 WiFi Network

The PoC Service Layer 102 also interacts with the following entities on the IP network 144:

The Gateway 142 transfers IP packets between the PoC Client 136 and the various servers:
    SIP/IP signaling messages between the PoC Server 112 and PoC Client 136 for control traffic exchange (i.e., control packets) for PoC call sessions.
    RTP/IP, RTCP/IP and MBCP/IP packets between the Media Server 114 and PoC Client 136 for bearer traffic exchange (i.e., voice packets) for PoC call sessions.
    SIP/IP signaling messages between the Presence Server no and PoC Client 136 for presence information.
    XCAP/HTTP/IP and SIP/IP signaling between the XDM Server 108 and PoC Client 136 for document management.
    SIP/IP signaling messages between the XDM Server 108 and PoC Client 136 for receiving the authentication code required for PoC Client 136 activation from the handset 134.

2.4 PoC Service Layer Elements

As noted above, the PoC Service Layer 102 is comprised of the following elements:
- PoC Server 112,
- Media Server 114,
- Presence Server 110,
- XDM Server 108, and
- Gateway 142.

These elements are described in more detail below.

2.4.1 PoC Server

The PoC Server 112 handles the PoC call session management and is the core for managing the PoC services for the PoC Clients 136 using SIP protocol. The PoC Server 112 implements a Control Plane portion of Controlling and Participating PoC Functions. A Controlling PoC Function acts as an arbitrator for a PoC Session and controls the sending of control and bearer traffic by the PoC Clients 136. A Participating PoC Function relays control and bearer traffic between the PoC Client 136 and the PoC Server 112 performing the Controlling PoC Function.

2.4.2 Media Server

The Media Server 114 implements a User Plane portion of the Controlling and Participating PoC Functions. The Media Server 114 supports the Controlling PoC Function by duplicating voice packets received from an originator PoC Client 136 to all recipients of the PoC Session. The Media Server 114 also supports the Participating PoC Function by relaying the voice packets between PoC Clients 136 and the Media Server 114 supporting the Controlling PoC Function. The Media Server 114 also handles packets sent to and received from the PoC Clients 136 for floor control during PoC call sessions.

2.4.3 Presence Server

The Presence Server no implements a presence enabler for the PoC Service. The Presence Server no accepts, stores and distributes Presence Information for Presentities, such as PoC Clients 136.

The Presence Server no also implements a Resource List Server (RLS), which accepts and manages subscriptions to Presence Lists. Presence Lists enable a "watcher" application to subscribe to the Presence Information of multiple Presentities using a single subscription transaction.

The Presence Server no uses certain XDM functions to provide these functions, which are provided by XDM Server 108.

2.4.4 XDM Server

The XDM Server 108 implements an XDM enabler for the PoC Service. The XDM enabler defines a common mechanism that makes user-specific service-related information accessible to the functions that need them. Such information is stored in the XDM Server 108 where it can be located, accessed and manipulated (e.g., created, changed, deleted, etc.). The XDM Server 108 uses well-structured XML documents and HTTP protocol for access and manipulation of such XML documents. The XDM Server 108 also connects to the operator SMSC 128 for the purposes of PoC Client 136 activation using SMS. In addition, the XDM Server 108 maintains the configuration information for all PoC subscribers.

2.4.5 Gateway

The Gateway 142 implements a interworking solution for the PoC Service to communicate via one or more IP network 144 access points to the PoC Clients 136. Specifically, the Gateway 142 provides PoC Service over an IP network 144 (such as an external WiFi network), as well as the wireless data networks 126, and supports a seamless user experience while the transport of IP control messages and IP voice data is transitioned between different types of wireless communications networks, such as wireless data networks 126 comprising cellular data packet networks and IP networks 142. The Gateway 142 also resolves security concerns that arise with such interworking solutions.

This is necessary because the quality, performance and availability of the wireless data networks 126 typically vary from location to location based on various factors. In addressing these issues, the interworking solution implemented by the Gateway 142 provides following benefits:

- PoC Services becomes available even in those locations where a wireless data network 126 is not available, but where a general purpose IP network 144 is available. This is particularly more useful in enhancing in-building coverage for the PoC Service.
- By connecting over the IP network 144, the available IP bandwidth, quality and performance can be more streamlined and controlled since the IP network 144 (typically) has a greater capacity and throughput as compared to the wireless data network 126, which is more shared in nature.
- By utilizing the greater available bandwidth over the IP network 144, as compared to the wireless data network 126, it is possible to provide additional services (such as sharing large files) which otherwise is inefficient and costly on wireless data networks 126.

These and other aspects of the interworking solution are described in more detail below.

2.5 Management Layer Elements

As noted above, the Management Layer 104 is comprised of the following elements:
- Element Management System (EMS) Server 116,
- Lawful Intercept (LI) Server 118,
- Web Group Provisioning (WGP) Server 122, and
- Web Customer Service Representative (WCSR) Server 120.

These elements are described in more detail below.

2.5.1 EMS Server

The EMS Server 116 is an operations, administration, and maintenance platform for the system 100. The EMS Server 116 enables system administrators to perform system-related configuration, network monitoring and network performance data collection functions. The EMS Server 116, or another dedicated server, may also provide billing functions. All functions of the EMS Server 116 are accessible through a web-based interface.

2.5.2 LI Server

The LI Server 118 is used for tracking services required by various Lawful Enforcement Agents (LEAs). The LI Server 118 generates and pushes an IRI (Intercept Related Information) Report for all PoC Services used by a target. The target can be added or deleted in to the PoC Server 112 via the LI Server 118 using a Command Line Interface (CLI).

2.5.3 WGP Server

The WGP Server 122 provides a web interface for corporate administrators to manage PoC contacts and groups. The web interface includes contact and group management operations, such as create, delete and update contacts and groups.

2.5.4 WCSR Server

The WCSR Server 120 provides access to customer service representatives (CSRs) for managing end user provisioning and account maintenance.

Typically, it supports the following operations:
- Create Subscriber account,
- Update Subscriber account, Delete Subscriber account,
Mobile number change command,
View Subscriber details (MDN, Group, Group members),
Manage Corporate Accounts,
Add CSR account,
Delete CSR account.

3 SYSTEM FUNCTIONS

The following sections describe various functions performed by each of the components of the system architecture.

3.1 PoC Service Layer 3.1.1 PoC Server

The PoC Server 112 controls PoC call sessions, including 1-1, Ad Hoc and Pre-Arranged PoC call sessions. The PoC Server 112 also controls Instant Personal Alerts.

The PoC Server 112 expects the PoC Clients 136 to setup "pre-established sessions" at the time of start up and use these sessions to make outgoing PoC calls. The PoC Server 112 also uses pre-established sessions to terminate incoming PoC calls to the PoC Clients 136. The PoC Clients 136 are setup in auto-answer mode by default. The use of pre-established sessions and auto-answer mode together allow for faster call setup for PoC call sessions.

The PoC Server 112 allocates and manages the media ports of the Media Services 114 associated with each SIP INVITE dialog for pre-established sessions and controls the Media Servers 114 to dynamically associate these ports at run time for sending RTP packets during PoC call sessions. Media ports are assigned and tracked by the PoC Server 112 at the time of setting up pre-established sessions. The PoC Server 112 instructs the Media Server 114 to associate the media ports of various subscribers dynamically into a session when a PoC call is originated and this session is maintained for the duration of the call. The PoC Server 112 also controls the floor states of the various participants in a PoC call session by receiving indications from the Media Servers 114 and sending appropriate requests back to the Media Servers 114 to send MBCP messages to the participants in the PoC call. The Media Server 114 uses the media ports association and current talker information to send the RTP packets from the talker's media port onto the listeners' media ports.

In addition, the PoC Server 112 handles the incoming and outgoing Instant Personal Alerts (IPAs) by routing SIP MESSAGE requests to the PoC Clients 136 and remote PoC Servers 112 for final delivery as applicable.

The PoC Server 112 uses static and dynamic data related to each subscriber to perform these functions. Static data include subscriber profile, contacts and groups. Dynamic data include the subscriber's registration state, PoC settings and SIP dialog states are maintained only on the PoC Server 112.

3.1.2 Media Server

The Media Server 114 handles the flow of data to and from the PoC Clients 136 as instructed by the PoC Server 112. Each Media Server 114 is controlled by a single PoC Server 112, although multiple Media Servers 114 may be controlled by a PoC Server 112 simultaneously.

The Media Server 114 is completely controlled by the PoC Server 112. As noted above, even the media ports of the Media Server 114 are allocated by the PoC Server 112 and then communicated to the Media Server 114. Likewise, floor control requests received by the Media Server 114 from PoC Clients 136 are sent to the PoC Server 112, and the PoC Server 112 instructs the Media Server 114 appropriately.

Based on these instructions, the Media Server 114 sends floor control messages to the PoC Clients 136 and sends the RTP packets received from the talker to all the listeners.

3.1.3 Presence Server

The Presence Server no accepts presence information published by PoC Clients 136, as well as availability information received from other entities. The Presence Server no keeps track of these presence states and sends notifications to various "watcher" applications whenever a presence state changes. The Presence Server no maintains separate subscriptions for each watcher and dynamically applies the presence authorization rules for each watcher independently.

The Presence Server no also accepts resource list subscriptions from the watchers, which identify one or more entities ("Presentities") whose presence should be monitored. The Presence Server no then aggregates all the presence information into one or more presence notifications transmitted to each watcher. This allows watchers to subscribe to large number of Presentities without putting strain on the network as well as client and server resources.

3.1.4 XDM Server

The XDM Server 108 performs client authentication and subscription functions. The XDM Server 108 also stores subscriber and group information data. The XDM Server 108 also interacts with the SMSC 128 to receive PoC Client 136 activation commands.

All subscriber provisioning and CSR operations in the XDM Server 108 are performed through the WCSR Server 120, while corporate administrative operations, as well as contacts and group management, are handled through the WGP Server 122.

The XDM Server 108 includes a Subscriber Profile Manager module that provides subscriber management functionality, such as creation, deletion and modification of subscriber profiles. The subscriber profile includes data such as the MDN, subscriber name, subscriber type, etc. This also determines other system-wide configurations applicable for the subscriber including the maximum number of contacts and groups per subscriber and the maximum number of members per group.

The XDM Server 108 includes a Subscriber Data Manager module that manages the subscriber document operations, such as contact and group management operations, initiated by the PoC Clients 136 or the WGP Server 122.

3.1.5 Gateway

The Gateway 142 performs interworking for the PoC service by communicating with the PoC Clients 136 via one or more IP networks 142 and/or wireless data networks 126.

The PoC Client 136 sets up one or more connections using the configured Fully Qualified Domain Name (FQDN), or absolute domain name, of the Gateway 142, which may be publicly exposed to the Internet 142. Secure transport protocols may (or may not) be used for the connections across the IP networks 142 and/or wireless data networks 126. For example, the PoC Clients 136 may use the Transport Layer Security (TLS) and/or Secure Sockets Layer (SSL) protocols for encrypting information transmitted over the connections between the PoC Client 136 and the Gateway 142.

In such an embodiment, all SIP signaling and voice data (RTP and RTCP) would be tunneled over the SSL/TLS connections between the PoC Client 136 and the Gateway 142. XCAP signaling may be transmitted using a Hypertext Transfer Protocol Secure (HTTPS) protocol, which results from layering the Hypertext Transfer Protocol (HTTP) on top of the SSL/TLS connections, thus adding the security capabilities of SSL/TLS to standard HTTP communications.

Consequently, the Gateway 142 performs as an encryption/decryption off-loader that provides end-to-end encryption for all traffic transmitted to and from the PoC Client 136. Specifically, all of the traffic sent to the PoC Client 136 is encrypted at the Gateway 142 and all the traffic received from the PoC Client 136 is decrypted at the Gateway 142.

The Gateway 142 terminates the SSL/TLS connections and aggregates or dis-aggregates the PoC Client 136 traffic to the appropriate Servers 108, 110, 112, 114, 116, 118, 120 and 122. Specifically, the Gateway 142 acts as an intelligent traffic distributor for SIP signaling and RTP/RTCP traffic by forwarding the traffic to the appropriate Servers 108, 110, 112, 114, 116, 118, 120 and 122, depending on the message types and the availability of the Servers 108, 110, 112, 114, 116, 118, 120 and 122. Consequently, the Gateway 142 is a single point-of-contact for all traffic to and from the PoC Clients 136 at an IP transport layer via the IP networks 142 and/or wireless data networks 126.

Typically, the SSL/TLS connections are persisted and used for any bidirectional data transfer between the Gateway 142, or other Servers, and the PoC Clients 136. Thus, a PoC Client 136 maintains an "always-on" connection with the Gateway 142 by periodically sending "keep-alive" messages over the SSL/TLS connections.

The system also simplifies the use of the WiFi APs 144 and Multicast Routers 146.

3.2 Management Layer 3.2.1 EMS Server

The EMS Server 116 is the central management entity in the system and includes the following modules:

A central application where all management business logic resides.

A web server for serving the network operator's internal users. A corresponding client provides a user interface for viewing fault, configuration, performance and security information.

A subsystem is provided for health monitoring of network elements deployed in the system and also to issue any maintenance commands as applicable.

3.2.2 WCSR Server

The WCSR Server 120 provides a web user interface for customer service representatives (CSRs) to carry out various operations. The web user interface provides access to CSRs for managing subscriber provisioning and account maintenance. Typically, it supports the following operations.

Create Subscriber account,
Update Subscriber account,
Delete Subscriber account,
Mobile number change command,
Forced synchronization of a Subscriber,
Deactivate a Subscriber account,
Reactivate a Subscriber account,
View Subscriber details, such as MDN, Group, Group members.

3.2.3 WGP Server

The WGP Server 122 allows provides for central management of all corporate subscribers and associated contacts and groups within a corporation. The WGP Server 122 allows corporate administrators to manage contacts and groups for corporate subscribers.

The WGP Server 122 includes a Corporate Administration Tool (CAT) that is used by corporate administrators to manage contacts and groups of corporate subscribers. The CAT has a Web User Interface for corporate administrators that supports the following operations:

Group management,
Contact management, and
Associations between corporations.

With regard to group management, the CAT of the WGP Server 122 includes the following operations:

Create, Update, Delete and View Corporate Groups,
Add, Update, Delete and View Members of a Corporate Group,
Manage Subscribers,
Activate and Deactivate a Corporate Subscriber,
Change a Subscriber type from "Corporate" to "Corporate And Public", and vice versa,
Restrict Availability, i.e., do not allow subscriber to change their presence status, and
Manage number porting or name change via phone assignment.

With regard to contact management, the CAT of the WGP Server 122 includes the following operations:

Phone list management,
N×N Contact Add (e.g., N contacts may be members of N groups),
Add, Update, Delete and View Contacts for a specific subscriber, and
Export and Import contacts at both the subscriber and corporate level.

With regard to associations between corporations, the CAT of the WGP Server 122 includes the following operations:

Corporate Associations Attributes,
Association Name,
Association ID,
Association Mode (e.g., One-way, Two-way), and
Restricted List.

Once the association is created and accepted, corporate administrators can create contacts and groups using the association policies. Administrators from other corporations can view the contacts, and may or may not have the capability to add, update or delete the contacts.

Corporate ID associated per corporate subscriber,
Central management of corporate subscribers, groups, and contacts,
Intercorporate associations, including contacts and whitelists,
Phone list management (e.g., N×N contact add),
Restrict Availability, and
Import and Export contacts at both the subscriber and corporate level.

Note that, if the association is deleted, then usually all intercorporate contacts and group members will be deleted.

3.3 PoC Client

The PoC Client 136 is an OMA-compatible client application executed on a handset 134. The following features are supported by the PoC Client 136:

PoC Calls and Instant Personal Alert,
Presence, and
Contact and Group Management.

The PoC Client 136 includes a database module, a presence module, an XDM module and a client module.

The database module stores configuration information, presence information, contact and group information, user settings, and other information in an optimized and persistent way. Information is preserved when the user unregisters with the PoC Server 112 or power cycles the device. The database module also has a mechanism to reset the data and synchronize from the XDM Server 108 when the data in the database module is corrupt or unreadable.

The presence module creates and maintains the presence information for the subscriber. Typically, the presence information supports Available, Unavailable and Do-not-Disturb (DnD) states. The presence module also subscribes to the Presence Server no as a "watcher" of all contacts in the handset 134 and updates the user interface of the handset 134 whenever it receives a notification with such presence information.

The XDM module communicates with the XDM Server 108 for management of contacts and groups. The XDM module may subscribe with the XDM Server 108 to send and receive any changes to the contacts or group list, and updates the user interface of the handset 134 based on the notifications it receives from the XDM Server 108.

The client module provides the most important function of making and receiving PoC calls. To support PoC calls, the client module creates and maintains pre-established sessions with the PoC Server 112. The client module supports 1-1, Ad Hoc and Pre-Arranged PoC calls. The client module also supports sending and receiving Instant Personal Alerts (IPA).

4 STATE DIAGRAM FOR A POC CALL SESSION

Figure 2:
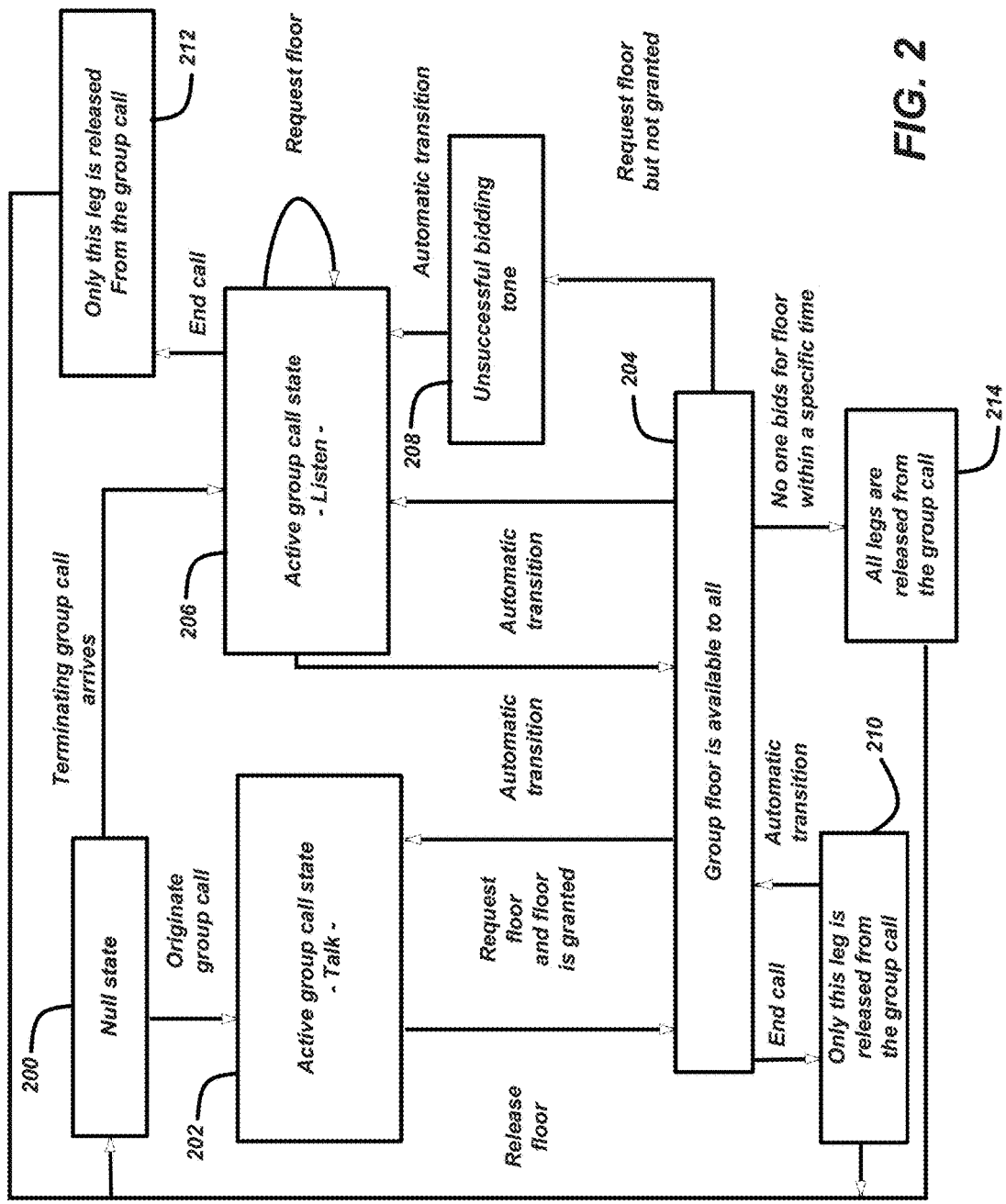
FIG. 2 is a state diagram that illustrates the operation of a PoC call session according to one embodiment of the present invention.

FIG. 2 is a state diagram that illustrates the operation of a PoC call session according to one embodiment of the present invention.

State 200 represents a PoC Client 136 in a NULL state, i.e., the start of the logic. A transition out of this state is triggered by a user making a request to originate a PoC call, or by a request being made to terminate a PoC call at the handset 134. A request to originate a PoC call is normally made by pressing a PoC button, but may be initiated in this embodiment by dialing some sequence of one or more numbers on the handset 134 that are interpreted by the PoC Server 112, by pressing one or more other keys on the handset 134 that are interpreted by the PoC Server 112, by speaking one or more commands that are interpreted by the PoC Server 112, or by some other means.

State 202 represents the PoC Client 136 in an active group call state, having received a "floor grant" (permit to speak). In this state, the user receives a chirp tone that indicates that the user may start talking. The user responds by talking on the handset 134. The handset 134 uses the reverse traffic channel to send voice frames to the Media Server 114, and the Media Server 114 switches voice frames only in one direction, i.e., from talker to one or more listeners, which ensures the half-duplex operation required for a PoC call.

State 204 represents the group "floor" being available to all members of the group. When the talking user signals that the floor is released, the floor is available to all group members. The signal to release the floor is normally made by releasing the PoC button, but may be performed in this embodiment by voice activity detection, e.g., by not speaking for some time period (which is interpreted by the PoC Server 112 as a release command). All members of the group receive a "free floor" tone on their handset 134. A user who requests the floor first (in the "free-floor" state), for example, is granted the floor, wherein the system boo sends a chirp tone to the successful user. The signal to request the floor is normally made by pressing the PoC button, but may be performed in this embodiment by voice activity detection, e.g., by speaking for some time period (which is interpreted by the PoC Server 112 as a request command).

State 206 represents the PoC Client 136 being in an active group call state. In this state, the user is listening to the group call. If a non-talking user requests the floor in the active group call state, the user does not receive any response from the system 100 and remains in the same functional state. As noted above, the signal to request the floor is normally made by pressing the PoC button, but may be performed in this embodiment by voice activity detection, e.g., by speaking for some time period (which is interpreted by the PoC Server 112 as a request command).

State 208 represents a user receiving an "unsuccessful bidding" tone on his handset 134, after the user has requested the floor, but was not granted the floor, of the group call. The user subsequently listens to the voice message of the talking user.

Non-talking users (including the talking user who must release the floor to make it available for others) can request the system 100 to end their respective call legs explicitly.

State 210 represents a terminating leg being released from the call after the user ends the call.

State 212 also represents a terminating leg being released from the call after the user ends the call.

State 214 represents all terminating legs being released from the call when no user makes a request for the within a specified time period, or after all users have ended their respective call legs.

5 GROUP CALLS USING RELAY-MODE AND DIRECT-MODE

5.1 Overview

The present invention provides solutions for performing group calls using Relay-Mode and/or Direct-Mode operations. Specifically, the present invention provides call delivery methods for group calls using Relay-Mode and Direct-Mode operations with a local area network (LAN), which may be a local WiFi network 146, or with a network of handsets 134 communicating using Direct Mode communications. Using Relay-Mode and Direct-Mode operations, not all participants' devices are required to be connected directly to a wide area network (WAN), such as the cellular phone network 124, wireless data network 126, or IP network 144.

5.2 Introduction

Advanced voice services (AVS), especially Advanced Group Services (AGS), such as Push-to-talk-over-Cellular (PoC), Push-to-Talk (PTT), or Press-to-Talk (P2T), as well as Broadcast Calls, can burden network and server resources significantly due to the large number of control and voice messages, especially group calls that involve a large number of participants. The burden on both network and server resources can cause intermittent failures or more serious issues where service could become completely unusable.

When the group calls are PoC or PTT calls, there will be only one talker at a time and there will be multiple listeners, wherein the participants of the call can take turns talking (transmitting) using the floor control mechanisms described above, while other participants will only listen. In PoC or PTT calls, the PoC Server 112 is required to replicate the voice packets received from the talker leg to one or more listener legs, for example, using the Media Server 114, so that the PoC Client 136 or other applications in the handsets 134 can receive the packets and play the voice. When a unicast network bearer is used, the voice packets need to duplicated for each of the listener legs separately. When a multicast network bearer is used, the voice packets need to be duplicated for each of the multicast streams, wherein a single multicast stream may service a set of one or more listener legs.

When the group calls are broadcast calls, which are a variant of PoC and PTT calls, there will be only one talker and the rest of the members of the group are only allowed to listen. Like PoC and PTT calls, the PoC Server 112 is required to replicate the voice packets received from the talker leg to one or more listener legs, for example, using the Media Server 114, so that the PoC Client 136 or other applications in the handsets 134 can receive the packets and play the voice. Like PoC and PTT calls, the voice packets need to duplicated for each of the listener legs separately when a unicast network bearer is used, and the voice packets need to be duplicated for each of the multicast streams, wherein a single multicast stream may service a set of one or more listener legs, when a multicast network bearer is used. In the case of broadcast calling, based on the nature of its usage, the requirement to deliver the voice packets in real-time may be less stringent than interactive group calls. On the other hand, the number of participants in the group could be much larger, including potentially thousands of users.

Such simultaneous transmission of voice packets to large numbers of listener legs may strain network resources, especially for Radio Access Networks (RANs), such as cellular wireless networks 124 and wireless data networks 126, which are designed for highly optimized usage of the wireless spectrum and usage of the air interface (wireless spectrum) is scheduled for each user based various factors in the network, such as available spectrum bandwidth, overall load conditions, priority of the user, etc. This could cause service quality degradation or the complete loss of service to participants.

Network congestion problems would likely be more severe when the RAN used to deliver the call comprises the cellular phone network 124. Typically, the cellular phone network 124 is not equipped to handle sudden large surge of IP traffic.

In addition, the packet delivery ability of the RAN is influenced by various factors. Such factors may include the load on the network, the distance of the handset 134 from the network antenna 132, path losses due to the surrounding environment, and other factors.

Generally, in such circumstances it may be beneficial to utilize a Relay-Mode or Direct-Mode operation, as described in more detail below.

5.3 Relay-Mode

In Relay-Mode operation, one or more of the handsets 134 of a group is assigned to be a Relay Device that routes a group call between the WAN and other handsets 134 of the group that are accessible only by the LAN. The Relay Device allows handsets 134 that may not currently have access to the WAN, but do have access to the Relay Device via the LAN, to participate in the group call.

In this embodiment, some or all of the handsets 134 that comprise a group may be enabled to use any or all of the networks 124, 126 and/or 142 that comprise the WAN. In addition, some or all of the handsets 134 that comprise a group may be WiFi-enabled, such that they can communicate locally among themselves using the local WiFi network 146 that comprises the LAN. However, some of the handsets 134 in the group may be blocked from and currently not have access to the WAN. On the other hand, some of these handsets 134 in the group may have access to the LAN. In Relay-Mode operation, the handsets 134 that are Relay Devices route IP packets between themselves and other handsets 134 using the LAN and, in turn, relay these IP packets to the WAN.

In effect, the Relay Devices act as routers for the other handsets 134, thereby enabling access to the group call for handsets 134 that are blocked from and currently do not have access to the WAN.

Another benefit of Relay-Mode operation is the possibility of utilizing IP Multicast Mode packet delivery for broadcast calls over the LAN, without requiring any special network configurations to tunnel the IP Multicast Mode packets over the WAN.

Figure 3:
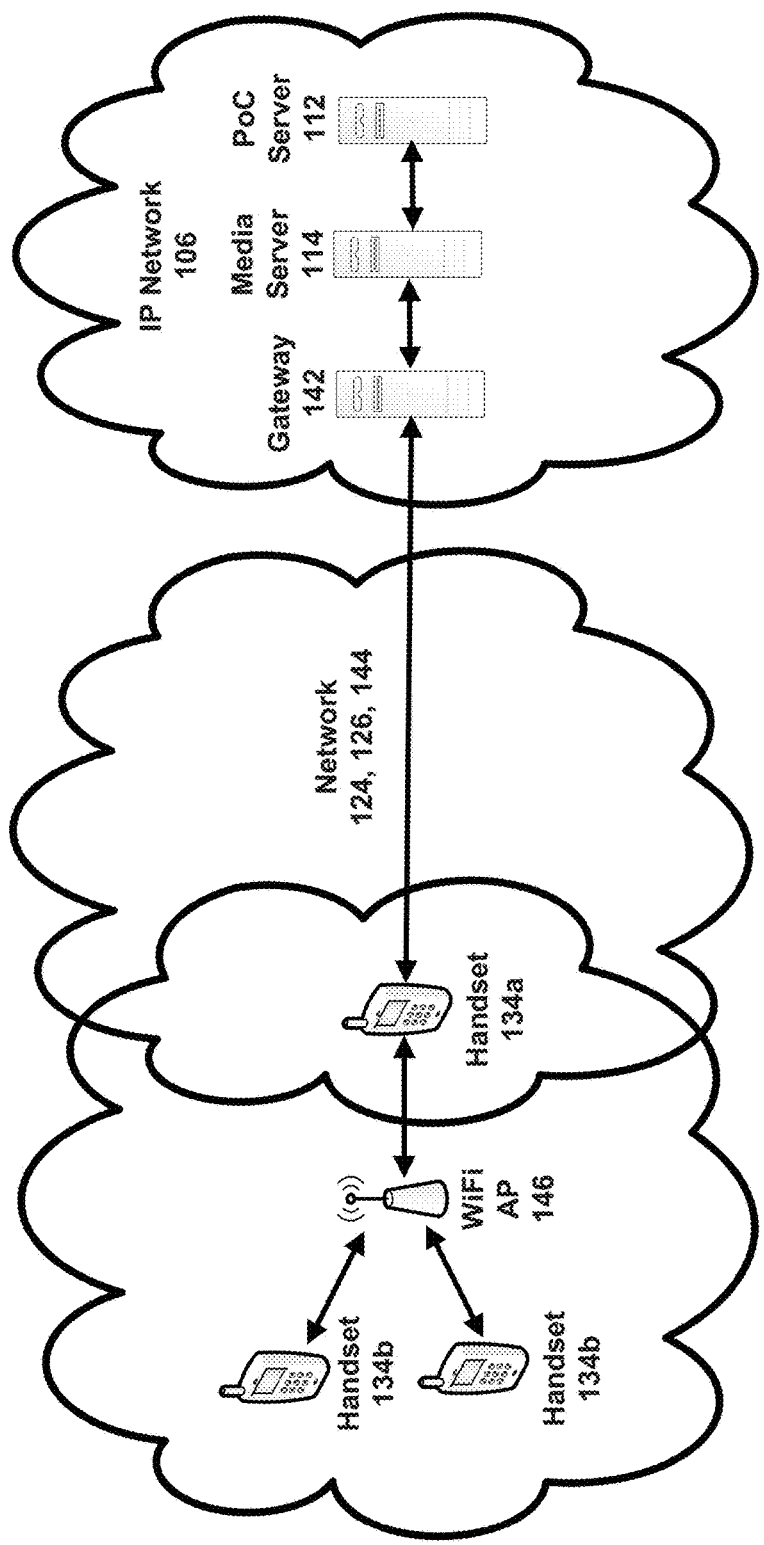
FIG. 3 illustrates Relay-Mode operation when there is limited radio access network (RAN) connectivity to a wide area network (WAN), but local WiFi connectivity to a LAN (local area network), for one or more handsets in a group, according to one embodiment of the present invention.

5.3.1 Relay-Mode Operation with Limited RAN Connectivity and Local WiFi Connectivity FIG. 3 illustrates Relay-Mode operation when there is limited RAN connectivity to the WAN, but local WiFi connectivity to the LAN, for one or more handsets in a group, according to one embodiment of the present invention.

In this embodiment, at least one handset 134a that includes a PoC Client 136 is assigned a role as a Relay Device 134a. Preferably, the role of Relay Device 134a is assigned by the PoC Server 112, although that function may be delegated to other servers as well.

The PoC Server 112 maintains a list of all handsets 134 with PoC Clients 136 connected through the LAN, but not the WAN. The local WiFi network 146 may be identified, for example, by the WiFi Service Set Identifier (SSID), which comprises the WiFi network 146 name.

The role of Relay Device 134a is assigned by the PoC Server 112 based on one or more criteria, such as signal strength, battery power level, type of handset 134a, etc. The PoC Server 112 may assign the role of Relay Device 134a to more than one handset 134 within the WiFi SSID.

The PoC Server 112 then informs all of the other handsets 134b within the group of the Relay Device 134a. The other handsets 134b that lack RAN connectivity to the WAN, but have local WiFi network 146 connectivity to the LAN, connect instead with the Relay Device 134a through the LAN. The use of the Relay Device 134a thus extends the coverage for group calling to handsets 134b in a larger area.

The Relay Device 134a may establish a secure IP connection (e.g., TLS, DTLS, SRTP, etc.) with the PoC Server 112, Media Server 114, Gateway 140, and/or the other handsets 134b to accomplish its functions. The Relay Device 134a may connect to the PoC Server 112, Media Server 114, Gateway 140, through the WAN, i.e., via the cellular phone network 124, the wireless data network 126 and/or the IP network 144.

The Relay Device 134a performs an IP forwarding function, i.e., it receives IP packets from the PoC Server 112 and/or Media Server 114 via the WAN, and forwards the IP packets to other handsets 134b via the LAN. Similarly, the Relay Device 134a receives the IP packets from the other handsets 134b via the LAN, and relays the IP packets to the PoC Server 112 and/or Media Server 114 via the WAN.

The Relay Device 134a may also provide a packet duplication function for media and floor control. For example, the leader Relay Device 134a may receive an IP packet stream for a group call from the PoC Server 112 and/or Media Server 114, and then duplicate the IP stream to the other handsets 134b within the group that are covered under the relay. The duplicated IP streams could be unicast to each of the other handsets 134b; alternatively, the IP streams could be multicast to all of the other handsets 134b.

In one embodiment, there may be multiple Relay Devices 134a, wherein the Relay Devices 134a communicate with each other, in order to elect one of the handsets 134a as a leader Relay Device 134a. The election of the leader Relay Device 134a can be based on specified WiFi network 146 conditions, at the Relay Devices 134a or the WiFi AP 146, such as signal strength, battery level, quality of Internet/WAN access, etc. The leader Relay Device 134a then communicates with the PoC Server 112 and/or the Media Server 114 over the WAN.

The other handsets 134b that lack RAN connectivity to the WAN, but have local WiFi connectivity to the LAN, connect to one or more of other Relay Devices 134a, or the leader Relay Device 134a. In turn, the other Relay Devices 134a connect to the leader Relay Device 134a. Each of the Relay Devices 134a keeps track of the handsets 134b connected through them to the leader Relay Device 134a.

5.1.3 Relay-Mode Operation with Unicast Tunneling of Multicast Packets

Figure 4:
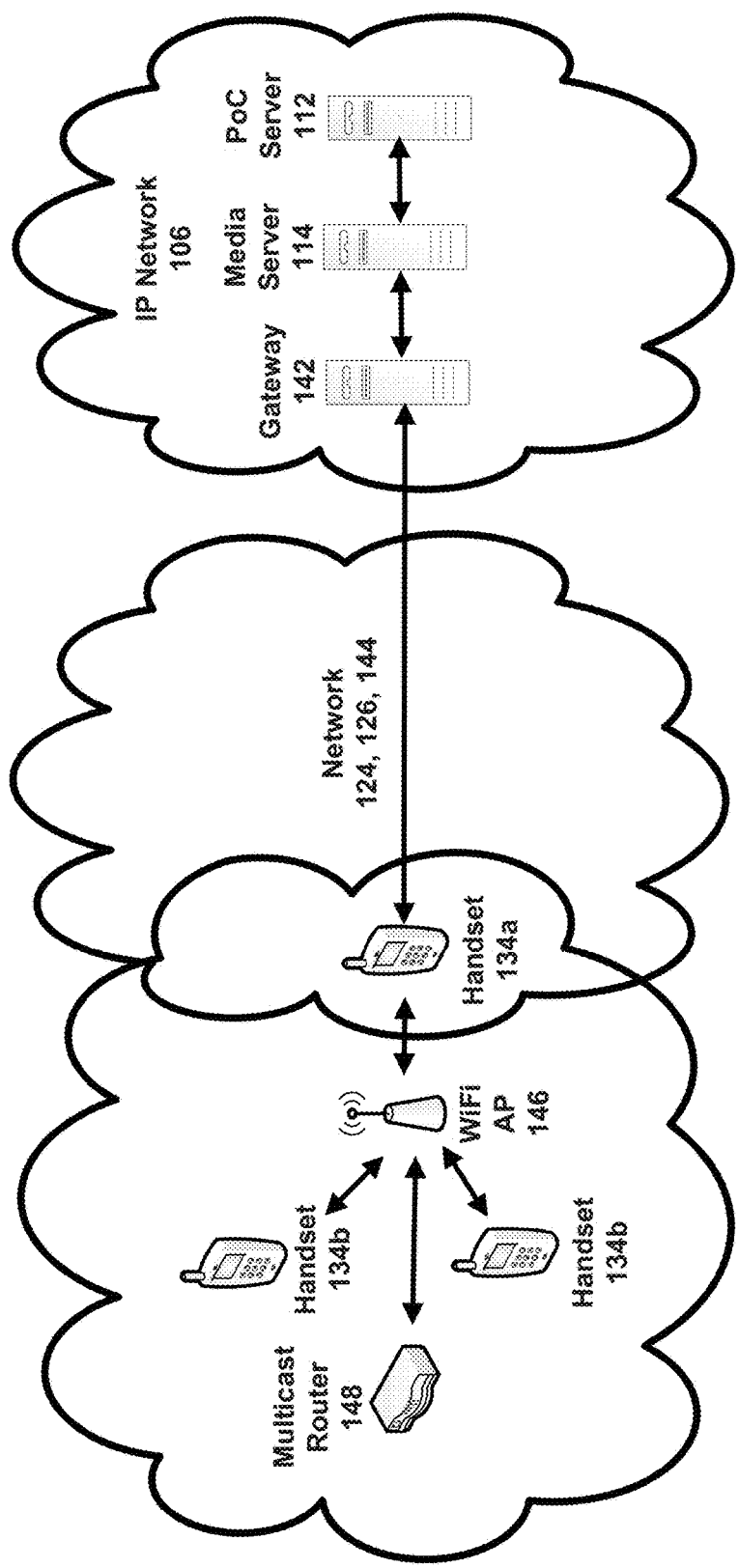
FIG. 4 illustrates Relay-Mode operation when there is limited RAN connectivity to the WAN, with local WiFi connectivity to the LAN, and the unicast tunneling of multicast IP packets, for one or more handsets in a group, according to one embodiment of the present invention.

FIG. 4 illustrates Relay-Mode operation when there is limited RAN connectivity to the WAN, with local WiFi connectivity to the LAN, and the unicast tunneling of multicast IP packets, for one or more handsets in a group, according to one embodiment of the present invention.

In this embodiment, the use of the Relay Device 134a also enables seamless transportation of multicast IP packets to the local WiFi network 146. For example, multicast IP packets often cannot be sent over the Internet to a private WiFi network 146 directly, because most routers drop such multicast IP packets.

Using the Relay Device 134a, however, no special network configuration is required to tunnel multicast IP packets to the private WiFi network 146. For example, the PoC Server 112 and/or Media Server 114 may encapsulate multicast IP packets within unicast IP packets transmitted to the Relay Device 134a. The Relay Device 134a then forwards the multicast IP packets to one or more Multicast Routers 148 within the private WiFi network 146. In turn, the Multicast Routers 148 route the multicast IP packets locally to the other handsets 134b, within the private WiFi network 146.

Otherwise, the Relay Device 134a operate in the same manner as described above in FIG. 3.

5.4 Direct-Mode

Sometimes it is necessary to provide PoC calls when the WAN and/or the LAN is severely congested, or the WAN and/or the LAN is completely inaccessible, leading to either complete loss of service or serious degradation of service quality. During such network congestion conditions, generally it is beneficial to utilize the Direct-Mode operation for PoC calls, in which one or more of the participants' handsets 134 is chosen as an Anchoring Point, such that it can route IP packets between participants' handsets 134 that cannot be accessed using the local WiFi network 146 using WiFi-Direct.

In Direct-Mode operation, one or more of the handsets 134 of a group is assigned to be an Anchoring Point that routes a group call between the WAN and other handsets 134 of the group that are accessible only by WiFi-Direct or other direct modes of communication (such as Family Radio Service (FRS), General Mobile Radio Service (GMRS), or Terrestrial Trunked Radio (TETRA)). The Anchoring Point allows handsets 134 that may not currently have access to either the WAN or the LAN, but do have access to the Anchoring Point via WiFi-Direct, to participate in the group call.

In this embodiment, some or all of the handsets 134 that comprise a group may be enabled to use any or all of the networks 124, 126 and/or 142 that comprise the WAN. In addition, some or all of the handsets 134 that comprise a group may be WiFi-enabled, such that they can communicate locally among themselves using the local WiFi network 146 that comprises the LAN and/or WiFi-Direct. However, some of the handsets 134 in the group may be blocked from and currently not have access to the WAN. In addition, some of these handsets 134 in the group may not have access to the LAN, but do have connectivity to other handsets 134. In Direct-Mode operation, the handsets 134 that are Anchoring Points route IP packets between themselves and other handsets 134 using WiFi-Direct and, in turn, relay these IP packets to the WAN or the LAN.

In effect, the Anchoring Points act as routers for the other handsets 134, thereby enabling access to the group call for handsets 134 that are blocked from and currently do not have access to the WAN.

Figure 5:
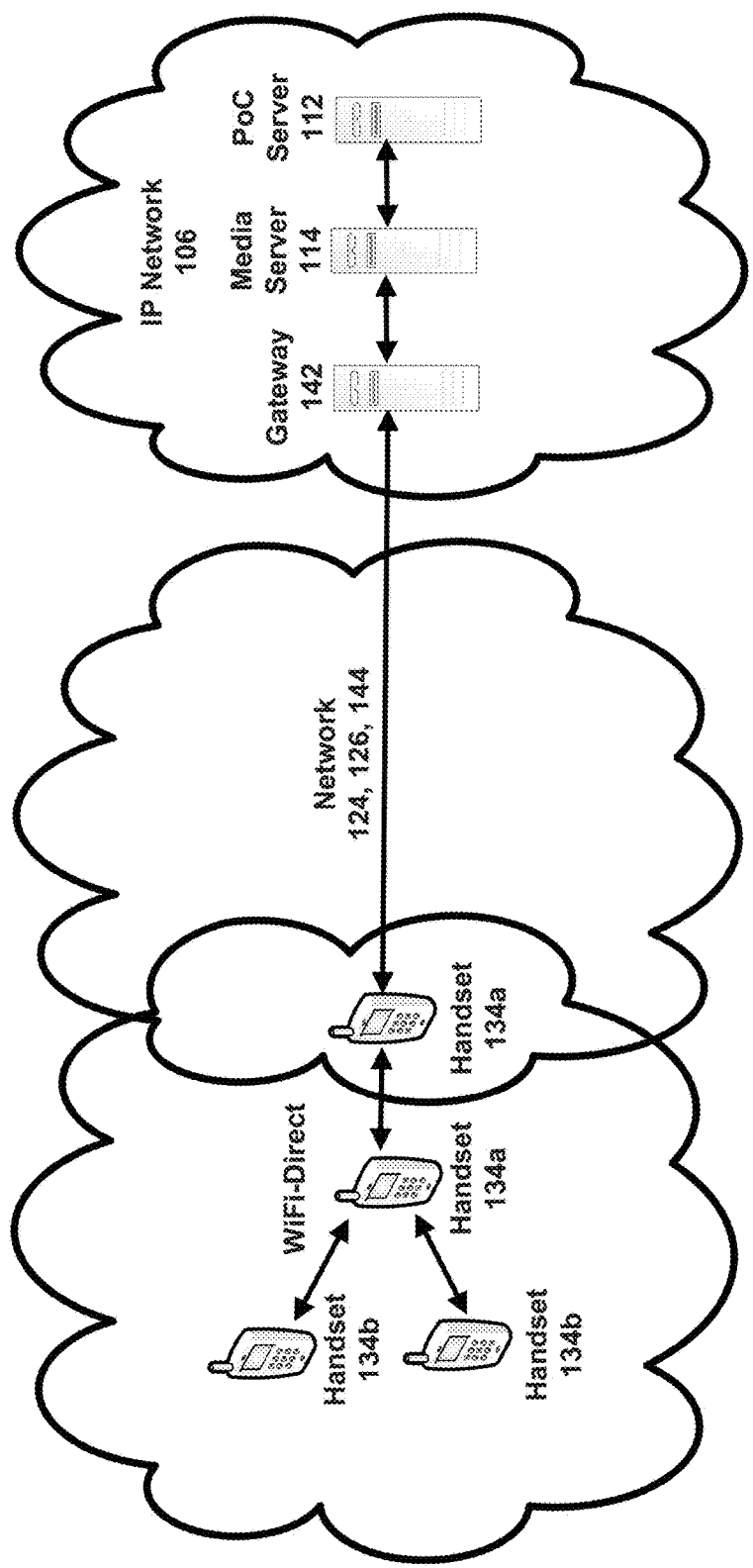
FIG. 5 illustrates Direct-Mode operation when there is limited RAN connectivity to the WAN, without local WiFi connectivity to a LAN, but with Direct Mode connectivity using WiFi-Direct, for one or more handsets in a group, according to one embodiment of the present invention.

5.4.1 Direct-Mode Operation with Limited RAN Connectivity and No Local WiFi Connectivity FIG. 5 illustrates Direct-Mode operation when there is limited RAN connectivity to the WAN, and no local WiFi connectivity to the WAN through the LAN, but there is Direct-Mode connectivity using WiFi-Direct, for one or more handsets in a group, according to one embodiment of the present invention.

In this embodiment, each of the handsets 134 has a device-to-device capability for Direct-Mode operations using WiFi-Direct communications, where two handsets 134 interact with each other without requiring an intervening LAN infrastructure. This capability is useful as a backup in the event of emergencies, such as disaster situations, or simply when the handsets 134 are outside the LAN coverage area, but at least one of the handsets 134a is within the WAN coverage area.

At least one handset 134a that includes a PoC Client 136 is assigned a role as an Anchoring Point 134a. Specifically, in the absence of a local WiFi network 146, when the handsets 134 have the capability to perform WiFi-Direct, for local WiFi connectivity, the Anchoring Points 134a are handsets 134a that act as Direct-Mode access points, e.g., "hot spots," for the other handsets 134b.

Preferably, the role of Anchoring Point 134a is assigned by the PoC Server 112, although that function may be delegated to other servers as well. The PoC Server 112 maintains a list of all handsets 134 with PoC Clients 136 connected through the Anchoring Point 134a, but not the WAN. The list of all handsets 134 may be identified, for example, as a Direct-Mode Communication Group (DMCG) using a unique identifier assigned and maintained by the PoC Server 112.

The role of Anchoring Point 134a is assigned by the PoC Server 112 based on one or more criteria, such as battery capacity, antenna capability, type of handset 134a, etc. The PoC Server 112 may assign the role of Anchoring Point 134a to more than one handset 134 within the DMCG.

The PoC Server 112 then informs all of the other handsets 134b within the DMCG of the Anchoring Point 134a. The other handsets 134b that lack RAN connectivity to the WAN, and that lack local WiFi network 146 connectivity to the LAN, connect instead with the Anchoring Point 134*a* using WiFi-Direct. The use of the Anchoring Point 134*a* thus extends the coverage for group calling to handsets 134*b* in a larger area.

The Anchoring Point 134*a* may establish a secure IP connection (e.g., TLS, DTLS, SRTP, etc.) with the PoC Server 112, Media Server 114, Gateway 140, and/or the other handsets 134*b* to accomplish its functions. The Anchoring Point 134*a* may connect to the PoC Server 112, Media Server 114, Gateway 140, through the WAN, i.e., the cellular phone network 124, the wireless data network 126 and/or the IP network 144.

The Anchoring Point 134*a* performs an IP forwarding function, i.e., it receives IP packets from the PoC Server 112 and/or Media Server 114 via the WAN, and forwards the IP packets to other handsets 134*b* via WiFi-Direct. Similarly, the Anchoring Point 134*a* receives the IP packets from the other handsets 134*b* via WiFi-Direct, and relays the IP packets to the PoC Server 112 and/or Media Server 114 via the WAN.

The Anchoring Point 134*a* may also provide a packet duplication function for media and floor control. For example, the leader Anchoring Point 134*a* may receive an IP packet stream for a group call from the PoC Server 112 and/or Media Server 114, and then duplicate the IP stream to the other handsets 134*b* within the group that are connected via WiFi-Direct. The duplicated IP streams could be unicast to each of the other handsets 134*b*; alternatively, the IP streams could be multicast to all of the other handsets 134*b*.

In one embodiment, there may be multiple Anchoring Points 134*a*, wherein one of the handsets 134*a* is pre-selected by the PoC Server 112 as a leader Anchoring Point 134*a*. The selection of the leader Anchoring Point 134*a* can be based on DMCG criteria, such as battery capacity, antenna capability, type of handset 134, etc. The leader Anchoring Point 134*a* then communicates with the PoC Server 112 and/or the Media Server 114 over the WAN.

The other handsets 134*b* that lack RAN connectivity to the WAN, and that lack local WiFi network 146 connectivity to the LAN, connect to the leader Anchoring Point 134*a*, or one or more of the other Anchoring Points 134*a*, via WiFi-Direct. In turn, the other Anchoring Points 134*a* connect to the leader Anchoring Point 134*a*. Each of the Anchoring Points 134*a* keeps track of the handsets 134*b* connected through them to the leader Anchoring Point 134*a*.

Note that the participants' handsets 134 need to be pre-provisioned, prior to entering to the Direct-Mode of operation, with a required configuration that enables them to discover each other and communicate with each other. This is achieved by having the handset 134, when connected to the PoC Server 112 via the WAN, download the necessary configuration information to the PoC Client 136. The PoC Client 136 on the handset 134 stores this configuration information in order to later invoke Direct-Mode operation.

Specifically, this configuration information may comprise pre-provisioned security credentials that allow the PoC Clients 136 on the handsets 134 to identify and authenticate each other prior to the Direct-Mode operation. Moreover, this configuration information may comprise the pre-assigned unique identification for the DMCG for all handsets 134 in the group.

In alternative embodiments, participants' handsets 134 that are members of a group can communicate with each either directly using the WiFi-Direct communications, or by communicating through the WiFi AP 146, or by some combination of the two modes of communication. For example, the WiFi AP 146 can be used to extend the coverage for Direct-Mode operations, with the use of one or more Relay Devices 134*a* in the WiFi AP 146 coverage area, combined with the use of one or more Anchoring Points 134*a* in the WiFi-Direct coverage area. In such an embodiment, the leader Anchoring Point 134*a* receives a list of all handsets 134 that belong to the DMCG and may enable some of those handsets 134 with Relay-Mode capability as Relay Devices 134*a*. All the handsets 134 within the DMCG are informed about available Relay-Devices 134*a* within the DMCG, which enables the handsets 134 to fallback to Relay-Mode operation if possible, during conditions when Direct-Mode communications with the leader Anchoring Point 134*a* are not possible.

5.5 Group Call Delivery Using PoC Calling

In both the Relay-Mode and Direct-Mode operations discussed above, group call origination can be performed by the originating PoC Client 136 using normal PoC call origination methods.

When pre-established PoC sessions are employed, the group call origination involves sending a SIP REFER message with the Group Id (or URI) to the PoC Server 112 and then following the normal SIP/MBCP/RTP mechanisms used for PoC calls. The voice packets are transmitted using RTP packets as in normal PoC calls. The same can also be achieved using an on-demand PoC session that involves sending a SIP INVITE message with the Group Id (or URI) to the PoC Server 112 and then following normal PoC signaling and media transfer mechanisms. Preferably, the PoC Server 112 buffers the voice packets for the group call received from the originator until the voice packets are delivered to all participants of the group call. Group call delivery is performed to the terminating PoC Clients 136 and handsets 134 using normal PoC call termination methods.

5.6 Group Call Delivery Using a Messaging Framework

Group call delivery can also be implemented over a messaging framework.

When group calling starts, the PoC Client 136 sets up a messaging session. The PoC Client 136 records media into a file, which it sends periodically to the PoC Server 112. The PoC Server 112 sends the media files one-by-one in sequence to the recipients over the messaging session. The receiving PoC Clients 136 play the media files one-by-one in the order received.

Various methods may be used to transport media files. For example, media files may be transported using SIP/MSRP or HTTP file upload/download methods.

In the SIP/MSRP method, the originating PoC Client 136 establishes a PoC call session to transfer the media files to the PoC Server 112. The originating PoC Client 136 will keep the session established until the large group call is terminated. The PoC Server 112 delivers the media files to the recipients by establishing a PoC call session with each recipient. The transfer of the media files from the originating PoC Client 136 to the PoC Server 112 and from the PoC Server 112 to receiving PoC Clients 136 requires the setting up of MSRP sessions as well.

In the HTTP file upload/download method, the originating PoC Client 136 establishes an HTTP session to transfer the media files to the PoC Server 112. The originating PoC Client 136 may keep the HI IP session established until the group call is terminated. To deliver the media files to the recipients, the PoC Server 112 notifies the recipients via SIP (e.g. SIP NOTIFY) with an HTTP link to download the media files and other information regarding the group call. The recipient PoC Client 136 downloads the media files via an HI IP download mechanism, and then plays the media files.

5.7 Group Call Delivery and Floor Exchange Using Multicast and/or Unicast

As noted above, a multicast PoC group call may be initiated by a PoC Client 136 using a unicast mechanism. When the PoC Server 112 determines that some or all of the group members have joined a multicast group destination, it sends a single MBCP Connect message to each of the multicast IP addresses being used by the group members. The PoC Server 112 also sends separate MBCP Connect messages via unicast to remaining group members who have not joined the multicast group destination. Similarly, the PoC Client 136 that currently has the floor sends voice packets using unicast to the PoC Server 112, wherein the voice packets are duplicated and delivered by the PoC Server 112 to the other participants via multicast and/or unicast. This continues when the floor is released and subsequently taken by another PoC Client 136. That is, upstream voice packets are always unicast, while downstream voice packets are multicast or unicast.

5.8 Group Call Delivery Using Multicast Over WiFi Networks

As noted above, group call delivery may be performed using multicast methods over a WiFi network 146. Each handset 134 that is group member receives the group call delivery from the PoC Server 112, wherein there is one multicast address per pre-defined group. The same multicast group destination is used across all of the networks to which group members may be connected, The originator initiates the group call through unicast signaling to the PoC Server 112. The PoC Server 112 sends an incoming call indication to the group members, using a multicast delivery method via the WiFi AP 146 and Multicast Router 148, or a handset 134 using WiFi-Direct. Handsets 134 that have already joined the multicast group listen for packets at the designated multicast address, and thus they receive the indication. The originator (or the current talker) sends all voice messages (and control messages) by unicast to the PoC Server 112. In turn, the PoC Server 112 sends all voice messages (and control messages) received from the originator (or the current talker) to the listeners using a multicast delivery method, and the messages are subsequently received by all listeners.

5.9 Multicast IP Address Provisioning to PoC Clients

In one embodiment, a multicast IP address can be reserved and allocated per group or based on other criteria (such as corporation Id). In such instances, the following steps may be performed:

For each SSID of a WiFi network:
1. Configure a tunneling mechanism such as VPN/GTP.
2. If a VPN is used, configure the shared passwords, the security scheme being used, the IP address of the point of contact, etc.
3. If a GTM is used, configure the IP address of the point of contact, such as an IP address for the Multicast Router 148.
4. The PoC Server 112 automatically assigns a multicast IP address in the following manner:
   One multicast address per group, and
   A unique port number per group (e.g. if there are 10 multicast-capable groups, then 10 different ports are allocated).

5.10 Group Call Delivery Using LTE eMBMS

A multicast PoC group call may also use LTE eMBMS on the wireless data network 126. Multimedia Broadcast Multicast Services (MBMS) is a point-to-multipoint interface specification for wireless data networks 126, which is designed to provide efficient delivery of broadcast and multicast services, both within a cell as well as within the core network. eMBMS is the LTE version of MBMS.

The MBMS feature is split into the MBMS Bearer Service and the MBMS User Service. The MBMS Bearer Service includes Multicast and Broadcast Modes with only the Broadcast mode available over LTE. The MBMS Bearer Service uses multicast IP addresses for the IP flows. The advantage of the MBMS Bearer Service compared to unicast bearer services is that the transmission resources in the network are shared, and one MBMS packet flow may be replicated as needed by GGSNs 138, SGSNs 140, and radio network controllers such as BSCs or eNodeBs 132.

The MBMS User Service offers both Streaming and Download Delivery Methods. The Streaming Delivery method can be used for continuous transmissions, while the Download Method is intended for "Download and Play" services.

5.11 Security Aspects of Group Call Delivery Using Multicast

Since current multicast network bearer technology allows any client devices to listen to multicast IP packets, it is possible that unintended recipients also can listen to the multicast voice packets that are sent by the PoC Server 112. As a result, encryption of voice and control packets may be required with the decryption keys distributed only to intended recipients of the group call. One approach is to allocate an encryption key for each group, wherein the keys are generated and managed by the PoC Server 112 and the PoC Server 112 distributes the keys to the PoC Clients 136 either at the beginning of the call or beforehand, e.g., during registration, in which case the keys can be refreshed periodically for additional security. A standard SRTP mechanism may be used for encryption and decryption of the RTP and RTCP packets to carry voice and MBCP messages. Keys are communicated to the PoC Client 136 over secure unicast bearer either using SIP over TLS or SIP over DTLS.

5.12 The Combination of Multiple Transports

Group calling methods may be combined based on the participants' access network types and the distribution of members of the group across various access networks. The PoC Server 112 employs mechanisms to track the access network type for group call participants, as well as participants' concentration within a location area covered by an access network or subdivision thereof (such as a cell, sector, access point, etc.).

Consequently, the appropriate calling method may employed to establish calls with each of the participants. For example, the participants' access network type can be tracked during login, periodic registration, on every call origination, or every time the handset 134 changes location, at a subdivision level. In such cases, the PoC Server 112 intelligently decides the appropriate mechanism to be used for each of the participants.

One approach is to utilize unicast methods where the use of multicast is not necessary or multicast is not available. Further, the PoC Server 112 can also take into account the number of group calls occurring in same area, whenever such information is available, to make best efforts to avoid network congestion.

For example, the PoC Server 112 may take the following decision steps in order to use an appropriate calling method based on a participant's network access type:

- The PoC Server 112 determines the total number of online/available participants of the group call. If the number of participants is small enough, so that network congestion is not possible for any of the access networks of the participants, then group calling is establishing using normal PoC calling methods.
- The PoC Server 112 categorizes the potential participants by network access type. If the number of users for each of the access network type does not exceed the limit set for that access network type, then normal PoC calling methods can be used for those participants. Otherwise, a delivery method that avoids network congestion is employed and the chosen calling method is based on the participant's access network type:
  - For participants concentrated in a UMTS cell, message or PoC call based group calling methods are employed.
  - For participants concentrated in an LTE Cell that supports multicast, an eMBMS based calling method is employed.
  - For participants concentrated in a WiFi SSID that supports multicast, a WiFi multicast calling method is employed.
  - For participants concentrated in a WiFi SSID that does not support multicast, a PoC calling/message based group calling method is employed.
  - For participants that are distributed across various locations and network access types, a unicast based regular PoC calling method is employed.
- Alternatively, the PoC Server 112 might be configured to always use certain calling methods regardless of number of users in an access network type. For example, the PoC Server 112 can be configured to use a multicast based call delivery method for all WiFi users on certain SSIDs. In another example, the PoC Server 112 can be configured to use either PoC calling or message based methods for all users on UMTS.
- All limits are configurable in the PoC Server 112.
- The availability of multicast methods are configured in the PoC Server 112 based on the access network type and network identifier, such as SSID for WiFi, and Mobile Network Code (MNC) or Location Area Code (LAC) or Global Cell Id for 4G/LTE. The PoC Client 136 may aid the PoC Server 112 in developing such network capability learning by reporting such information to the PoC Server 112.

5.13 Broadcast Calling Overview

Broadcast calling has a number of key requirements. It must support large numbers of members or recipients, possibly up to 10,000 users or more. Moreover, all of the recipients of the broadcast call should able to receive the broadcast call message or voice completely and clearly, with minimal or no voice/packet loss.

The solutions for providing broadcast calling should be RAN and network friendly. The maximum number of simultaneous users that can receive the media/call should not to exceed the RAN/network capacity. Moreover, there should be near real-time delivery reports for each call, so that the originator can monitor the progress of delivery.

There should be options for the originator to review the broadcast call or message before transmitting the broadcast call or message. Possible options include: replay, delete, re-record, etc.

Other options may include:
- Guaranteed delivery of the broadcast call or message,
- Automatic retry attempts when the broadcast call or message is not delivered to the recipient,
- Deferred delivery, i.e. delivery of the broadcast call or message when an offline recipient becomes online,
- Additional discrete media types that can be added to the broadcast call or message, such as picture, text, video or any other media files, for example, a video message that can be transmitted in a broadcast call, instead of or along with, the voice message,
- Delivery that can be scheduled for a future time by the system.

5.14 Broadcast Group Management

A number of management tools are needed to support broadcast calling. For example, there should be control mechanisms to limit the capability to originate/send broadcast calls:

- Only privileged members of the group (e.g. administrators, etc.) can originate broadcast calling.
- There could be multiple privileged users in the group.
- Accessibility of the broadcast group participant list:
- The broadcast group is special type of group, which are maintained by administrators (e.g. using a CAT) with full authority. The broadcast group member list is also manipulated by certain privileged users such as supervisors, as determined by administrators.
- The visibility of the complete list of broadcast group members is access controlled. Based on an administrator's preference, the list can be made visible to the all members or only privileged members or only to the administrators.
- The users having access to the complete participant list may have full list readily available in the user's device (or client) or downloaded on demand by the user.
- Optionally, other users who do not have full access to the list may only have access to the basic information of the group such as group name or list of participants, etc.

For large group call delivery, there is a need for tools to support broadcast call originations:

- An originating PoC Client 136 records the broadcast message.
- Any options for the user to review, record, etc., are provided before the request is established with the PoC Server 112.
- The originating PoC Client 136 sends the broadcast message to the PoC Server 112 as a PoC call originated to the broadcast group (preferred), or as a message sent to the broadcast group.

Preferably, the PoC Server 112 buffers or records the complete broadcast call.

6 CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for providing communication services in a communications network comprising:
   a Push-to-Talk-over-Cellular (PoC) server configured to interface with a wireless communications network to perform communications services for a plurality of mobile units, the communications services including a two-way, half-duplex voice call within the plurality of mobile units comprising a PoC call session, wherein;
   the PoC server and the plurality of mobile units are configured to communicate with each other using control messages, and a media server is configured to switch PoC voice messages between the plurality of mobile units;
   the PoC server is configured to manage the PoC call session by acting as an arbitrator for the PoC call session, and manages sending of control messages and voice messages to and from the plurality of mobile units; and
   wherein a first mobile unit of the plurality of mobile units relays the control messages and the voice messages from the PoC server and the media server to a second mobile unit of the plurality of mobile units.

2. The system of claim 1, wherein the first mobile unit communicates with the PoC server and the media server using the wireless communications network, and wherein the first mobile unit communicates with the second mobile unit using a local area network (LAN), a direct mode of communication, or a combination thereof, wherein the wireless communications network and the LAN are not connected to each other.

3. The system of claim 1, wherein the PoC server maintains a list identifying one or more groups of mobile units, wherein the one or more groups of mobile units communicate locally within each group of the one or groups of mobile units using a local area network (LAN), a direct mode of communication, or a combination thereof.

4. A method comprising:
   providing, by a server in a telecommunications platform, push-to-talk (PTT) services to a plurality of mobile units;
   assigning, by the server, a first mobile unit of the plurality of mobile units to relay PTT services messages from the server to one or more second mobile units of the plurality of mobile units;
   transmitting, by the server, a PTT message to the first mobile unit using a wide area network (WAN); and
   instructing, by the server, the first mobile unit to relay the PTT message to the one or more second mobile units using a communications mechanism different than the WAN.

5. The method of claim 4 further comprising assigning the first mobile unit of the plurality of mobile units to relay PTT messages from the server to the one or more second mobile units based on signal strength of the first mobile unit, battery power level of the first mobile unit, antenna capability of the first mobile unit, mobile unit type of first mobile unit, network conditions of the communications mechanism, or a combination thereof.

6. The method of claim 4, wherein the communications mechanism different than the WAN comprises a local area network (LAN), a direct mode of communication, or a combination thereof.

7. The method of claim 4 further comprising maintaining, by the server, a list of the one or more second mobile units connected to the server through the first mobile unit using the communications mechanism different than the WAN.

8. The method of claim 7 further comprising assigning, by the server, a unique identifier associating the one or more second mobile units with the first mobile unit.

9. The method of claim 4 further comprising provisioning, by the server, direct mode configuration information, security credentials, a decryption key, or a combination thereof on the one or more second mobile units when the one or more second mobile units are connected to the WAN.

10. The method of claim 4, wherein the server instructs the first mobile unit to relay the PTT message to the one or more second mobile units using the communications mechanism different than the WAN when the one or second mobile units are not connected to the WAN.

11. The method of claim 4, wherein the server instructs the first mobile unit to relay the PTT message to the one or more second mobile units using the communications mechanism different than the WAN in accordance with potential congestion in the WAN, potential congestion in a local area network (LAN) used by the one or more second mobile units to communicate with the first mobile unit, or a combination thereof.

12. A method comprising:
    receiving, by a first mobile unit, a first message from a server of a telecommunications platform over a wide area network (WAN), wherein the telecommunications platform provides push to talk (PTT) services, wherein the first message is a PTT voice message or a PTT control message for a group call session; and
    relaying, by the first mobile unit, the first message to a second mobile unit over a communications mechanism different than the WAN, wherein the second mobile unit and the first mobile unit are participants of the group call session, wherein the communications mechanism comprises a local access network.

13. The method of claim 12, wherein the communications mechanism comprises a direct mode of communications.

14. The method of claim 13, wherein relaying, by the first mobile unit, the first message to the second mobile unit comprises forwarding, by the first mobile unit, the first message to a third mobile unit, wherein the third mobile unit is capable of a direct mode of communications with the second mobile unit.

15. The method of claim 12 further comprising:
    receiving, by the first mobile unit, a second message from the second mobile unit over the communications mechanism different than the WAN, wherein the second message is a voice message for the group call session; and
    forwarding, by the first mobile unit, the second message to the server of the telecommunications platform over the WAN.

16. The method of claim 12, wherein relaying, by the first mobile unit, the first message to a second mobile unit comprises multicasting the first message to the second mobile unit.

17. The method of claim 16, wherein multicasting the first message to the second mobile unit comprises forwarding, by the first mobile unit, the first message to a multicast router connected to the second mobile unit over a local area network (LAN).

18. The method of claim 12, wherein relaying, by the first mobile unit, the first message to a second mobile unit comprises unicasting the first message to the second mobile unit.

19. The method of claim 12 further comprising:
- duplicating, by the first mobile unit, the first message to provide a duplicated first message; and
- transmitting, by the first mobile unit, the duplicated first message to a fourth mobile unit over a communications mechanism different than the WAN, wherein the fourth mobile unit is also a participant in the group call session.

\* \* \* \* \*